(12) United States Patent
Ramprasad

(10) Patent No.: US 12,089,289 B2
(45) Date of Patent: Sep. 10, 2024

(54) SYSTEM AND PROCESS FOR CONFIGURING A DYNAMIC ROAMING PUBLIC LAND MOBILE NETWORK (PLMN)

(71) Applicant: TracFone Wireless, Inc., Miami, FL (US)

(72) Inventor: Satish Ramprasad, Miami, FL (US)

(73) Assignee: Tracfone Wireless, Inc., Miami, FL (US)

( * ) Notice: Subject to any disclaimer, the term of this patent is extended or adjusted under 35 U.S.C. 154(b) by 410 days.

(21) Appl. No.: 17/514,114

(22) Filed: Oct. 29, 2021

(65) Prior Publication Data

US 2022/0141641 A1 May 5, 2022

Related U.S. Application Data

(60) Provisional application No. 63/107,067, filed on Oct. 29, 2020.

(51) Int. Cl.
| | |
|---|---|
| *H04W 4/00* | (2018.01) |
| *H04W 8/12* | (2009.01) |
| *H04W 36/30* | (2009.01) |
| *H04W 36/32* | (2009.01) |
| *H04W 84/04* | (2009.01) |

(52) U.S. Cl.
CPC ............ *H04W 8/12* (2013.01); *H04W 36/30* (2013.01); *H04W 36/32* (2013.01); *H04W 84/042* (2013.01)

(58) Field of Classification Search
CPC ....... H04W 8/12; H04W 36/30; H04W 36/32; H04W 84/042
See application file for complete search history.

(56) References Cited

U.S. PATENT DOCUMENTS

| | | | | |
|---|---|---|---|---|
| 8,744,436 | B2 * | 6/2014 | Antrim | H04W 60/00 455/433 |
| 8,855,633 | B2 * | 10/2014 | Wu | H04W 48/08 455/437 |
| 9,031,555 | B2 * | 5/2015 | Kim | H04W 48/18 455/445 |
| 9,451,575 | B2 * | 9/2016 | Siomina | H04W 64/00 |
| 9,473,986 | B2 * | 10/2016 | Tomici | H04W 28/0289 |
| 9,521,540 | B2 * | 12/2016 | Liao | H04L 67/51 |
| 9,615,318 | B2 * | 4/2017 | Morper | H04W 88/16 |
| 10,856,194 | B2 * | 12/2020 | Brown | H04W 36/0066 |
| 11,310,712 | B2 * | 4/2022 | Xu | H04W 36/0033 |
| 11,595,312 | B2 * | 2/2023 | Savarese | H04L 61/4511 |
| 2013/0183971 | A1 * | 7/2013 | Tamaki | H04W 36/165 455/436 |

(Continued)

*Primary Examiner* — Amancio Gonzalez

(57) ABSTRACT

A process and system for implementing a dynamic roaming public land mobile network (PLMN) for at least one wireless network and at least one wireless device includes determining with a processor that at least one wireless device would benefit from modification of a public land mobile network (PLMN) based on at least one of the following: the at least one wireless device having poor wireless service performance, a change in wireless service rates for a wireless service carrier, reduced wireless service from a wireless service carrier, and a change in geographic location of a user of the at least one wireless device. Thereafter, the process and system updating a public land mobile network (PLMN) for the least one wireless device.

20 Claims, 5 Drawing Sheets

(56) References Cited

U.S. PATENT DOCUMENTS

| | | | |
|---|---|---|---|
| 2022/0217519 A1* | 7/2022 | Kim | H04W 4/12 |
| 2022/0330005 A1* | 10/2022 | Zhu | H04W 48/18 |
| 2022/0330006 A1* | 10/2022 | Zhu | H04W 76/18 |
| 2022/0353732 A1* | 11/2022 | Filippou | H04W 4/40 |
| 2022/0377582 A1* | 11/2022 | Sakamoto | H04W 24/02 |
| 2023/0074288 A1* | 3/2023 | Filippou | H04W 28/0236 |
| 2023/0156553 A1* | 5/2023 | Kim | H04W 4/06 455/436 |
| 2023/0275973 A1* | 8/2023 | Sakamoto | H04L 41/22 709/224 |

\* cited by examiner

SYSTEM AND PROCESS FOR CONFIGURING A DYNAMIC ROAMING PUBLIC LAND MOBILE NETWORK (PLMN)

CROSS-REFERENCE TO RELATED APPLICATIONS

This application claims the benefit from U.S. Provisional Application No. 63/107,067 filed on Oct. 29, 2020, which is hereby incorporated by reference in its entirety for all purposes as if fully set forth herein.

BACKGROUND OF THE DISCLOSURE

1. Field of the Disclosure

The disclosure relates to a system for configuring a dynamic roaming public land mobile network (PLMN). More specifically, the disclosure relates to a system for determining, configuring, implementing, and/or the like a dynamic roaming public land mobile network (PLMN). The disclosure further relates to a process for configuring a dynamic roaming public land mobile network (PLMN). More specifically, the disclosure relates to a process for determining, configuring, implementing, and/or the like a dynamic roaming public land mobile network (PLMN).

2. Related Art

A wireless device will typically implement a SIM (Subscriber Identity Module) card and the SIM card contains a public land mobile network (PLMN) list, roaming list, and/or the like. The public land mobile network (PLMN) list will typically allow the wireless device to connect, transfer, hop, and/or the like from one wireless network to another wireless network. This may be achieved via public land mobile networks (PLMNs), which may be wireless networks pre-configured in a memory of the SIM card. The memory of the SIM card may include a SIM profile.

Normally the SIM Profile is owned, controlled, configured, and/or the like by a Mobile Network Operator (MNO). In this regard, the Mobile Network Operator (MNO) may configure the public land mobile network (PLMN) list, and the public land mobile network (PLMN) list typically remains static throughout the life of the SIM card.

Because the public land mobile network (PLMN) list or roaming list is static, the wireless device would typically switch from one carrier to the next carrier only if the coverage is absent in a particular area and/or the wireless device is unable to camp on the roaming operator. In other words, the public land mobile network (PLMN) list or roaming list can possibly subject the wireless device to poor wireless service as well as other related undesirable issues.

Accordingly, it would be beneficial to have a system and process that allows a wireless device to obtain optimal wireless service and not be limited to wireless service controlled by a limited static set of configurations or public land mobile network (PLMN). Additionally, it would be beneficial to have a system and process that allows a wireless service provider to control wireless service for a wireless device and not be limited to wireless service controlled by a limited static set of configurations or public land mobile network (PLMN).

SUMMARY OF THE DISCLOSURE

The foregoing needs are met, to a great extent, by the disclosure, providing a system for configuring a dynamic roaming public land mobile network (PLMN). The foregoing needs are further met, to a great extent, by the disclosure, providing a process for configuring a dynamic roaming public land mobile network (PLMN).

One aspect of the disclosure includes a system configured to implement a dynamic roaming public land mobile network (PLMN) for at least one wireless network and at least one wireless device, the system includes a processor configured to determine that at least one wireless device would benefit from modification of a public land mobile network (PLMN) based on at least one of the following: the at least one wireless device having poor wireless service performance, a change in wireless service rates for a wireless service carrier, reduced wireless service from a wireless service carrier, and a change in geographic location of a user of the at least one wireless device; and the processor further configured to update a public land mobile network (PLMN) for the least one wireless device based on at least one of the following: the at least one wireless device having poor wireless service performance, a change in wireless service rates for a wireless service carrier, reduced wireless service from a wireless service carrier, and a change in geographic location of a user of the at least one wireless device.

One aspect of the disclosure includes a process for implementing a dynamic roaming public land mobile network (PLMN) for at least one wireless network and at least one wireless device, the process includes determining with a processor that at least one wireless device would benefit from modification of a public land mobile network (PLMN) based on at least one of the following: the at least one wireless device having poor wireless service performance, a change in wireless service rates for a wireless service carrier, reduced wireless service from a wireless service carrier, and a change in geographic location of a user of the at least one wireless device; and updating with the processor a public land mobile network (PLMN) for the least one wireless device based on at least one of the following: the at least one wireless device having poor wireless service performance, a change in wireless service rates for a wireless service carrier, reduced wireless service from a wireless service carrier, and a change in geographic location of a user of the at least one wireless device.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

Figure 1:
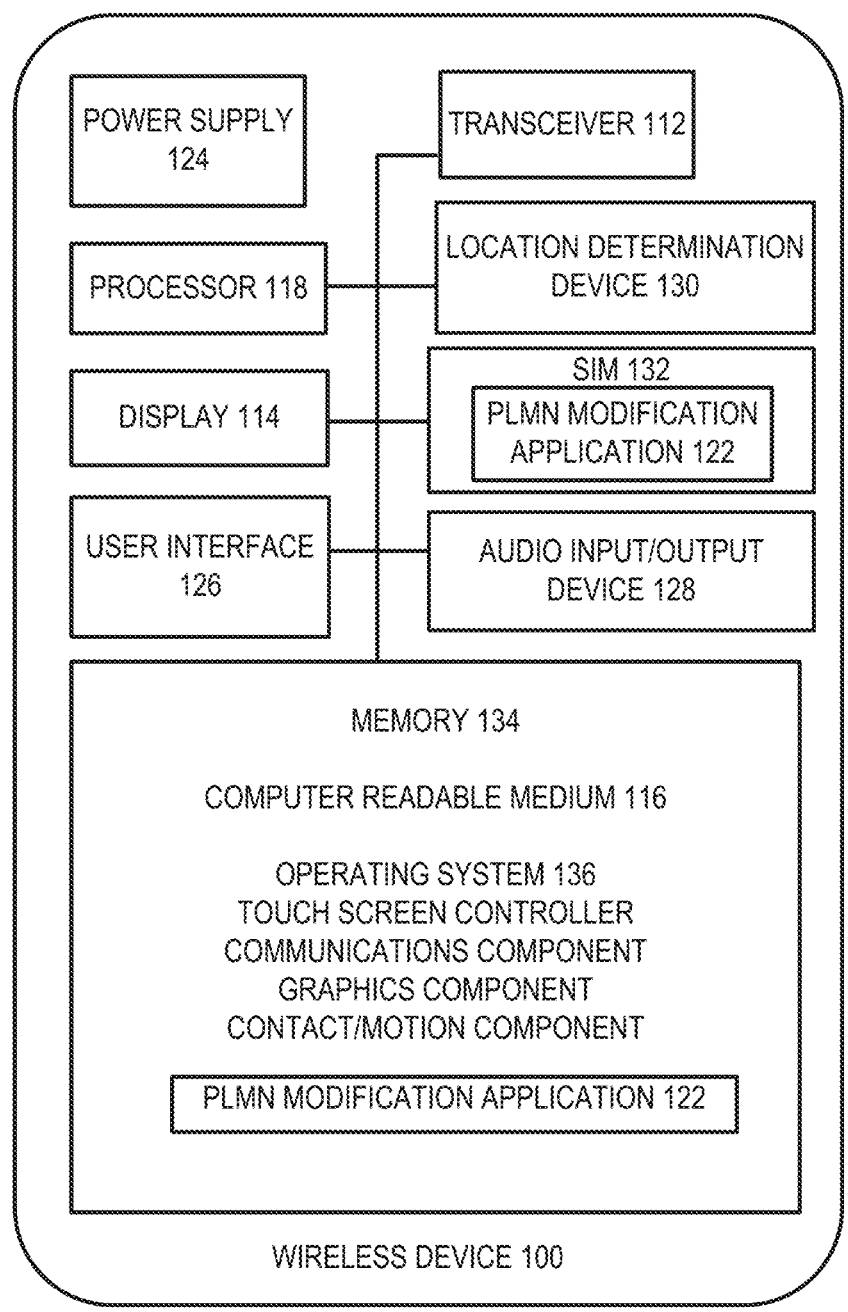
FIG. 1 illustrates an exemplary wireless device in accordance with aspects of the disclosure.

The disclosure relates to a system for configuring a dynamic roaming public land mobile network (PLMN). More specifically, the disclosure relates to a system for determining, configuring, implementing, and/or the like a dynamic roaming public land mobile network (PLMN). The disclosure further relates to a process for configuring a dynamic roaming public land mobile network (PLMN). More specifically, the disclosure relates to a process for determining, configuring, implementing, and/or the like a dynamic roaming public land mobile network (PLMN).

In this regard, a large number of wireless service plans exist for customers desiring wireless services such as data, talk, and text messaging. To obtain these wireless services, customers generally have the option of entering into a post-paid service (e.g., contract for a period of time) or a pre-paid, contract-free service. The latter offers customers the freedom to initiate and stop wireless services without incurring expensive cancellation fees associated with a post-paid service.

Generally, companies that provide post-paid wireless services are wireless carriers or Mobile Network Operators (MNO) that maintain and control their own wireless networks. An MNO heavily relies on backend systems to address any provisional, billing, security, and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including volume of data, number of minutes of airtime/voice, and number of text messages used. In this regard, MVNOs may have a plurality of agreements with and the rights to use a plurality of MNO networks.

Convenience, timeliness, cost, service, and reliability of a wireless device and/or the wireless providers' systems and services are key factors that play into a user's experience. By developing a system to improve at least these factors, a more positive experience can be provided to the wireless user. The improved experience will help retain customer base and increase the number of customers willing to purchase wireless services.

In order to improve this experience, the disclosure provides a system for configuring a dynamic roaming public land mobile network (PLMN) and/or a process for configuring a dynamic roaming public land mobile network (PLMN) that may provide improved wireless service for a wireless device that may be utilized by either MNOs or MVNOs.

In particular, the disclosure addresses a number of possible scenarios that may benefit from the disclosed system and process that includes configuring a dynamic roaming public land mobile network (PLMN). These possible scenarios include:

A roaming carrier higher in priority in a public land mobile network (PLMN) is scheduled for a downtime. For example, a roaming carrier higher in priority in a public land mobile network (PLMN) is scheduled for a downtime in a particular region. In this regard, the wireless user may benefit from a dynamic roaming public land mobile network (PLMN) for their wireless device configured to address this downtime.

The wireless services offered by a roaming carrier in terms of data throughput, latency, and/or the like are poor for user data. Additionally, the wireless services offered by a roaming carrier in terms of data throughput, latency, and/or the like are poor for user data, however the wireless services are adequate for coverage such as voice and SMS. In this regard, the wireless user may benefit from a dynamic roaming public land mobile network (PLMN) for their wireless device configured to address this poor wireless service.

The rates offered by roaming carriers may change, and the roaming carrier lower in the list of the public land mobile network (PLMN) may now offer a superior rate. In this regard, the wireless user and/or wireless carrier may benefit from a dynamic roaming public land mobile network (PLMN) for their wireless device configured to take advantage of wireless service having this superior rate. For example, such a carrier may be promoted higher in a priority listing utilizing the dynamic roaming public land mobile network (PLMN) of the disclosure.

The wireless device may have support for certain wireless service bands where the non-preferred roaming carrier has better wireless service such as a better QOS (quality of service) in a region, has a better rate on a certain band, and/or the like. In this regard, the wireless user and/or wireless carrier may benefit from a dynamic roaming public land mobile network (PLMN) for their wireless device configured to take advantage of this better wireless service. For example, a MVNO may utilize a dynamic roaming public land mobile network (PLMN) configured to prioritize a roaming carrier having better wireless service for a class of devices and/or subscribers.

In some aspects, data driven decisions that include changing the priority of roaming carriers, in a per subscriber/per class of wireless device level where signal strength, device capabilities, operator QOS, location, and/or the like can be determined, and cross referenced in order to provide the best experience to the customer. In this regard, the wireless user may benefit from a dynamic roaming public land mobile network (PLMN) configured for their wireless device to provide the best experience and/or best wireless service.

For any one or all of these various scenarios, the public land mobile network (PLMN) list, the roaming priority list, and/or the like may be changed at any point of time after activation, can be reviewed and modified once per billing period (per hour, per day, per week, per month, per year, and/or the like) for business rules to take effect, and/or the like.

The system for configuring a dynamic roaming public land mobile network (PLMN) and/or the process for configuring a dynamic roaming public land mobile network (PLMN) may include a SIM OTA Platform (SIM over the air Platform) that may include, connect, may be fed, may control, may be controlled, and/or the like by an intelligence infrastructure. The Intelligence infrastructure may incorporate business rules (rates), other data driven modelling of SIM, location-based information, device-based information, band based information, quality of service (QOS) capabilities, and/or the like and may change roaming PLMN list priorities.

In further aspects, if a user of the wireless device moves to a different geographical region, the system for configuring a dynamic roaming public land mobile network (PLMN) and/or the process for configuring a dynamic roaming public land mobile network (PLMN) may allow only operators in that region to be downloaded on the SIM. In this regard, the user and/or the wireless device may be range bound to only operate in the pre-set geographical region.

In various aspects, the system for configuring a dynamic roaming public land mobile network (PLMN) and/or the process for configuring a dynamic roaming public land mobile network (PLMN) may be implemented utilizing embedded SIM (e-SIM) capability. In particular aspects, the system for configuring a dynamic roaming public land mobile network (PLMN) and/or the process for configuring a dynamic roaming public land mobile network (PLMN) may use an MVNO SIM profile, a global profile, and/or the like. Additionally, the MVNO and/or MNO may partner with a third-party entity to ensure SIM OTA commands are sent to the wireless device and configure the wireless devices to roam to the best carrier network, as the configuration sees fit.

A large number of wireless service plans and wireless devices exist for customers desiring wireless services such as data, talk, text messaging, and/or the like. The wireless providers of those services typically provide wireless services from a wireless network to the wireless device utilizing various wireless protocols over a communication channel. For example, wireless service from a wireless network may be allocated use of one or more particular bands. Each band may implement a particular duplex mode that may include one of Frequency Division Duplexing (FDD), Time division duplex (TDD), Supplemental Downlink (SDL), and/or the like. Each band may further include an operating frequency, a subset of bands, an uplink frequency, a downlink frequency, a duplex spacing, a channel bandwidth, and/or the like. Typically, a particular wireless carrier may be allocated a portion of the various bands; and another particular wireless carrier may be allocated another portion of the various bands. This allocated portion of bands for a particular wireless service provider may not be optimal for a wireless user based on the user's wireless device, the user's geographic location, and/or the like. This results in less than optimal wireless service for some users.

In this regard, the system for configuring a dynamic roaming public land mobile network (PLMN) and/or the process for configuring a dynamic roaming public land mobile network (PLMN) may operate based on wireless service quality information. The wireless service quality information may be collected from various wireless networks and/or wireless devices. Thereafter, the wireless service quality information may be analyzed to ascertain whether wireless service from a particular wireless network may be a cause for poor wireless service performance. In one or more aspects, the wireless service quality information may be analyzed to ascertain whether wireless service from a particular wireless network that is implementing a particular allocation of different bands and technologies operating at various uplink and downlink frequencies in combination with a particular wireless device may be a cause for a particular wireless device to have poor performance in a particular geographic location. Thereafter, the system for configuring a dynamic roaming public land mobile network (PLMN) and/or the process for configuring a dynamic roaming public land mobile network (PLMN) may operate based on the collected wireless service quality information.

In this disclosure and claims it is to be understood that reference to a wireless device is intended to encompass electronic devices such as mobile phones, tablet computers, gaming systems, MP3 players, personal computers, PDAs, and the like. A "wireless device" is intended to encompass any compatible mobile technology computing device that can connect to a wireless communication network, such as mobile phones, mobile equipment, mobile stations, user equipment, cellular phones, smartphones, handsets, and/or the like (e.g., Apple iPhone, Google Android based devices, BlackBerry based devices, other types of PDAs or smartphones), wireless dongles, remote alert devices, Internet of things (IoT) based wireless devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide mobile phone services through the use of a wireless device, such as the Global System for Mobile Communication (GSM) network, Code-Division Multiple Access (CDMA) network, Long-Term Evolution (LTE) network, 4G, 5G, a Wi-Fi network, a network implementing a communication channel as defined herein, and the like that may utilize the teachings of the disclosure.

Reference in this specification to "one aspect," "an aspect," "other aspects," "one or more aspects" and/or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described, which may be requirements for some aspects but not for other aspects.

FIG. 1 illustrates an exemplary wireless device and its components, in accordance with aspects of the disclosure.

In particular, FIG. 1 illustrates an exemplary implementation of a wireless device 100. The wireless device 100 may include a transceiver 112, a display 114, a computer readable medium 116, a processor 118, and/or the like. The wireless device 100 may include a PLMN modification application 122, and/or the like for implementation with various aspects of the disclosure. However, in other aspects, the wireless device 100 may operate without a PLMN modification application 122 for implementation with various aspects of the disclosure.

The transceiver 112 can include, for example, a wireless antenna and associated circuitry capable of data transmission with a mobile data network utilizing at least one data transmission protocol utilizing one or more communication channels as defined herein. The transceiver 112 may transmit and receive data utilizing the data transmission protocol. Moreover, the transceiver 112 may provide voice and text message capabilities. In one aspect, the processor 118 and/or the transceiver 112 may be implemented as a wireless device chipset.

The display 114 of the wireless device 100 may be configured to display various information provided to the display 114 from the processor 118 of the wireless device 100, the computer readable medium 116, the PLMN modification application 122, and/or the like. The screen may be a light-emitting diode display (LED), an electroluminescent display (ELD), a plasma display panel (PDP), a liquid crystal display (LCD), an organic light-emitting diode display (OLED), an active-matrix organic light-emitting diode (AMOLED) display, an IPS (In-plane switching) liquid crystal display (LCD), or any other display technology.

The displayed information can include, for example, a graphical user interface for displaying icons, the network connection strength, the type of mobile network data connection (such as 3G, 4G LTE, EVDO, Wi-Fi, etc.) the wireless device 100 is connected to, and/or other information potentially useful to the user. The information may be displayed simultaneously, or the user may interact with an input device such as buttons on the wireless device 100 or, if the display 114 is a touch-screen, with the icons on the display 114 to cycle through the various types of information for display.

The wireless device 100 may also have a power supply 124. The power supply 124 may be a battery such as nickel cadmium, nickel metal hydride, lead acid, lithium ion, lithium ion polymer, and the like. The wireless device 100 may also include a memory 134, which could be an internal memory and/or a removable storage type such as a memory chip. The memory 134 may store information about the wireless device 100, including wireless profiles and settings. Additionally, the wireless device 100 may include an audio input/output device 128 for the input or output of sounds in videos, music, and the like.

The wireless device 100 may also have a user interface 126 to facilitate use of the wireless device 100 with an operating system 136. The operating system 136 may be associated with a touchscreen controller, one or more communications components, one or more graphics components, one or more contact/motion components, and the like.

In some aspects, the wireless device 100 and/or a wireless network 202 may estimate the location of the wireless device 100 based, at least in part, on a global navigation satellite system (GNSS) with a location determination device 130. In another aspect, a wireless network 202 may secure location determination based on a specific cell in which the wireless device 100 connects. In yet another aspect, a wireless network 202 may obtain location determination based on triangulation with respect to a plurality of cells in which the wireless device 100 receives signals. In yet another aspect, a wireless network 202 may obtain location determination based on a Location Area Code (LAC) for the wireless device 100. In yet another aspect, a wireless network 202 may obtain location determination based on a current cell tower identification (ID) that the wireless device 100 connects. The location information may be provided to the PLMN modification application 122, a wireless service quality information platform 290 as described herein, a SIM OTA platform 300 as described herein, and/or the like.

For the purposes of this disclosure, computer readable medium 116 stores computer data, which may include computer program code that may be executable by the processor 118 of the wireless device 100 in machine-readable form. By way of example, and not limitation, the computer readable medium 116 may include computer readable storage media, for example tangible or fixed storage of data, or communication media for transient interpretation of code-containing signals. Computer readable storage media, as used herein, refers to non-transitory physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 116 or machine-readable medium, which may be incorporated into a computer program product. The computer readable medium 116 may be configured to store the PLMN modification application 122.

The processor 118 can be, for example, dedicated hardware as defined herein, a computing device as defined herein, a processor, a wireless device processor, a microprocessor, a wireless device chipset, a central processing unit (CPU), a programmable logic array (PLA), a programmable array logic (PAL), a generic array logic (GAL), a complex programmable logic device (CPLD), an application-specific integrated circuit (ASIC), a field-programmable gate array (FPGA), any other programmable logic device (PLD), and/or the like configurable to execute the PLMN modification application 122. The processor 118 may be configured to execute the PLMN modification application 122.

The wireless device 100 may use a subscriber identity module (SIM) card or SIM 132. The SIM 132 may operate as disclosed herein to store, utilize, configure, implement, and/or the like a dynamic roaming public land mobile network (PLMN), a modifiable public land mobile network (PLMN), a roaming list, a dynamic roaming list, a dynamic public land mobile network (PLMN), and/or the like. In one aspect, the SIM 132 may store the dynamic roaming public land mobile network (PLMN).

In other aspects, the wireless device 100 may not use a subscriber identity module (SIM) card or SIM 132. In this aspect, the wireless device 100 may operate as disclosed herein to store, utilize, configure, implement, and/or the like a dynamic roaming public land mobile network (PLMN), a modifiable public land mobile network (PLMN), a roaming list, a dynamic roaming list, a dynamic public land mobile network (PLMN), and/or the like.

The SIM 132 may be a universal integrated circuit card (UICC). The SIM 132 may vary in size and may be a standard size SIM, a micro size SIM, a mini size SIM, a nano size SIM, or any other size SIM and/or the SIM 132 may be implemented as an embedded SIM (e-SIM). The embedded SIM (e-SIM), or embedded universal integrated circuit card (eUICC) may be a programmable SIM card that is embedded directly into the wireless device 100. In one or more aspects, the embedded SIM (e-SIM) may be provisioned remotely, may be configured to add operators, may be configured to remove operators, and/or the like consistent with the disclosure.

The SIM 132 may be associated with, store, and/or the like the PLMN modification application 122, which may manage the SIM 132 and/or the dynamic roaming public land mobile network (PLMN) to control which wireless networks the wireless device 100 may connect. The SIM 132 may store network-specific information used to authenticate and identify subscribers on the network including one or more of an integrated circuit card identifier (ICCID), International Mobile Subscriber Identity (IMSI), Authentication Key (Ki), Local Area Identity (LAI), Operator-Specific Emergency Number, and/or the like. The SIM 132 may also store other carrier-specific data such as the SMSC (Short Message Service Center) number, Service Provider Name (SPN), Service Dialing Numbers (SDN), Advice-Of-Charge parameters, Value Added Service (VAS) applications, and/or the like. The SIM 132 may be identified by its ICCID. ICCIDs may be stored in the SIM cards. The ICCID is defined by the ITU-T recommendation E.118 as the Primary Account Number. The SIM 132 layout may be based on ISO/IEC 7812. In some aspects, the SIM 132 may also be a soft SIM, electronic SIM, or embedded SIM. In some aspects, other memory locations of the wireless device 100 may store carrier-specific data such as the International Mobile Subscriber Identity (IMSI), Authentication Key (Ki), Local Area Identity (LAI), Operator-Specific Emergency Number, the SMSC (Short Message Service Center) number, Service Provider Name (SPN), Service Dialing Numbers (SDN), Advice-Of-Charge parameters, Value Added Service (VAS) applications, and/or the like.

The PLMN modification application 122 may be written in any programming language, such as, for example, C, Java, Objective-C, C+, Python, Visual Basic, Perl, or any other programming language the processor 118 is capable of executing. The PLMN modification application 122 may be made available by a SIM OTA platform 300, may be downloaded by the wireless device 100 from the SIM OTA platform 300, may be stored on a chipset, the SIM 132 of the wireless device 100, stored in the memory 134, may be part of the system bios of the wireless device 100, downloaded from an application store, downloaded from a digital distribution source, preinstalled, and/or the like. In one or more aspects, the PLMN modification application 122 may operate in conjunction with other software and/or applications on the wireless device 100, the wireless service quality information platform 290, the SIM OTA platform 300, and/or the like.

Figure 2:
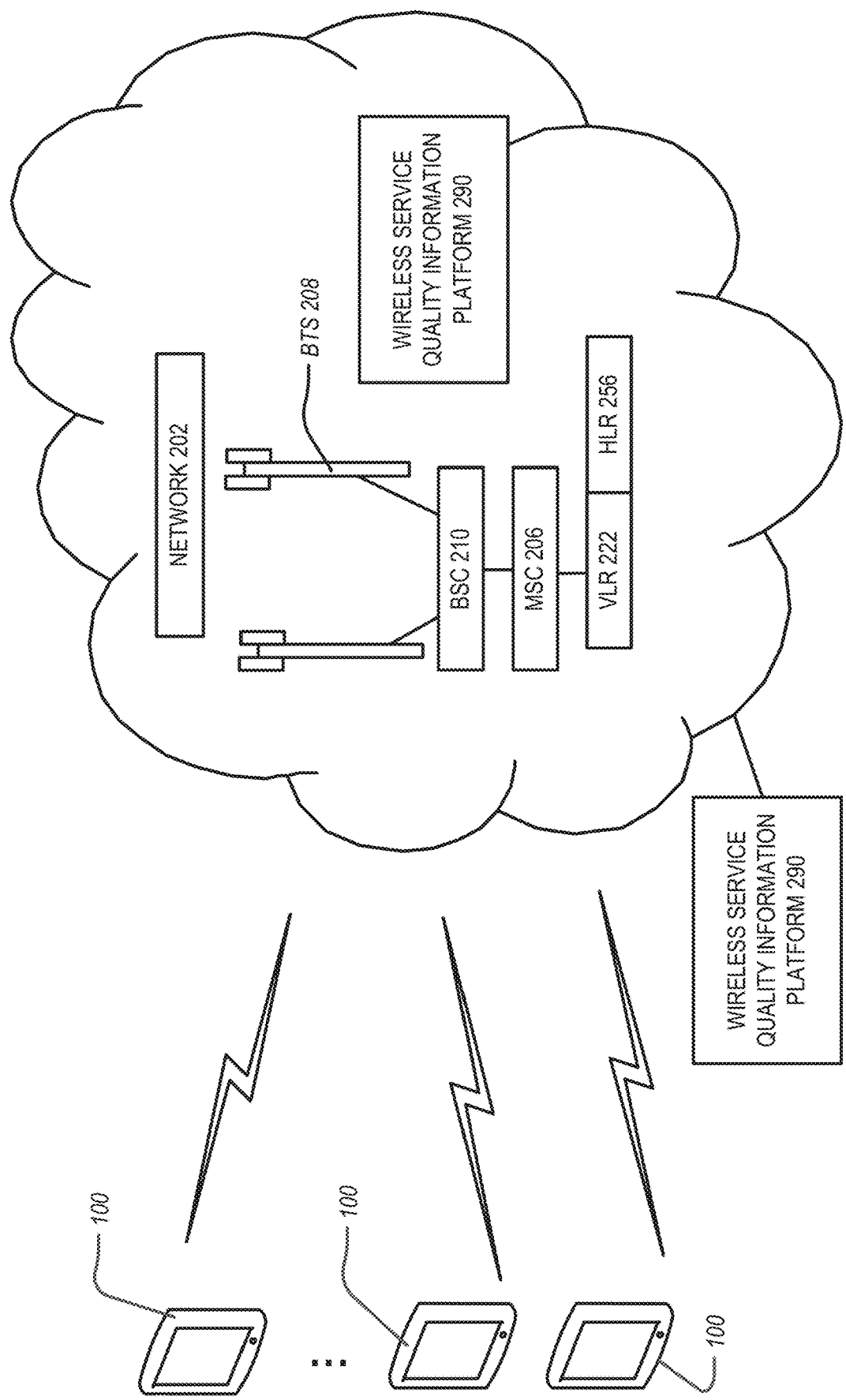
FIG. 2 illustrates an exemplary wireless network in accordance with aspects of the disclosure.

FIG. 2 illustrates an exemplary wireless network, in accordance with aspects of the disclosure.

In particular, FIG. 2 shows a wireless network 202 that may include a Mobile services Switching Center (MSC) 206 that may perform the switching of calls and that may include a Visitor Location Register (VLR) 222. The wireless network 202 may also include a Base Transceiver Station (BTS) 208 and a Base Station Controller (BSC) 210. The Base Transceiver Station (BTS) 208 houses the radio transceivers that define a cell and handle the radio-link protocols with the wireless device 100. The Base Station Controller (BSC) 210 may manage the radio resources for one or more Base Transceiver Station (BTS) 208. The Base Station Controller (BSC) 210 may be the connection between the wireless device 100 and the Mobile service Switching Center (MSC) 206.

A Home Location Register (HLR) 256 and the Visitor Location Register (VLR) 222 together with the Mobile services Switching Center (MSC) 206 may provide the call-routing and roaming capabilities. The Home Location Register (HLR) 256 may contain all the administrative information of each subscriber registered in the wireless network 202, along with the current location of the wireless device 100.

The wireless network 202 may include a home subscriber server (HSS), a user profile server function (UPSF), and/or the like. The HSS may be a master user database that supports IP Multimedia Core Network Subsystem (IMS) network entities. It may contain the subscription-related information (subscriber profiles), perform authentication and authorization of the user, and can provide information about the subscriber's location and IP information.

The wireless network 202 may include Unified Data Management (UDM). The UDM may be configured to manage network user data in a single, centralized element. In some aspects, the UDM may be configured similar to a 4G network home subscriber service (HSS) and the 3G network home location register (HLR). In some aspects, the UDM may be configured as a cloud-native configuration and designed for 5G specifically.

The wireless network 202 may include a radio access network (RAN). The radio access network (RAN) may be implemented as part of a mobile telecommunication system of the wireless network 202. The radio access network (RAN) may implement a radio access technology. The radio access network (RAN) may reside between the wireless device 100 and the wireless network 202 and may provide a connection with a core network (CN).

Additionally, the wireless network 202 may be configured to obtain wireless service quality information. The wireless service quality information may be obtained from one or more of a switch, the Mobile services Switching Center (MSC) 206, the Home Location Register (HLR) 256, the Visitor Location Register (VLR) 222, the home subscriber server (HSS), the Unified Data Management (UDM), a wireless service quality information processor, a wireless service quality information server, the wireless service quality information platform 290, and/or the like. For brevity of the disclosure, hereinafter the wireless service quality information may be referred to as being obtained from a wireless service quality information platform 290.

The wireless service quality information platform 290 may include a database to store the collected wireless service quality information. In one aspect, the wireless service quality information platform 290 may obtain at least some of the wireless service quality information directly. In one aspect, the wireless service quality information platform 290 may obtain at least some of the wireless service quality information from one or more components of the wireless network 202. In one aspect, the wireless service quality information platform 290 may obtain at least some of the wireless service quality information from one or more wireless devices 100. In one aspect, the wireless service quality information platform 290 may connect to the wireless network 202, may be implemented by the wireless network 202, may be hosted by the wireless network 202, and/or the like. In other aspects, the wireless service quality information platform 290 may be implemented and/or hosted outside the wireless network 202. In one aspect, the wireless service quality information platform 290 may connect to the wireless network 202 and may be implemented and/or hosted by an MVNO cloud, an MVNO system, an MVNO server, and/or the like.

The wireless service quality information may include one or more of the following: whether the wireless device 100 is registered to the Radio Access Network; a current cell tower identification (ID) that the wireless device 100 connects; a Location Area Code (LAC) for the wireless device 100; a signal strength (dB) for the wireless device 100 and/or the wireless network 202; a Signal-to-Noise Ratio (SNR) for the wireless device 100 and/or the wireless network 202; an LTE RSSI (Received Signal Strength Indicator) for the wireless device 100 and/or the wireless network 202; an LTE RSRQ (Reference Signal Received Quality) for the wireless device 100 and/or the wireless network 202; an LTE SINR (Signal to Interference & Noise Ratio) for the wireless device 100 and/or the wireless network 202; an LTE CQI (Channel Quality Indicator) for the wireless device 100 and/or the wireless network 202; a RSRP (Reference Signal Received Power) for the wireless device 100 and/or the wireless network 202; a data latency for the wireless device 100 and/or the wireless network 202; jitter for the wireless device 100 and/or the wireless network 202; a data throughput for the wireless device 100 and/or the wireless network 202; and/or the like.

In some aspects, the RSRP and the RSRQ may be measures of a signal level and quality for the wireless device 100 and/or the wireless network 202. In the wireless network 202, when the wireless device 100 moves from cell to cell and performs cell selection/reselection and handover, the wireless device 100 may measure the signal strength/quality. In aspects, the wireless network 202 and/or the wireless device 100 may measure parameters with respect to a reference signal that may include the RSRP (Reference Signal Received Power), the RSRQ (Reference Signal Received Quality), and/or the like.

The carrier RSSI (Receive Strength Signal Indicator) may measure the average total received power observed in OFDM (Orthogonal frequency-division multiplexing) symbols containing reference symbols. The parameters may also include the Reference Signal Received Power (RSRP). The RSRP may be considered a RSSI type of measurement. The RSRP may be interpreted as the power of the LTE Reference Signals spread over a full bandwidth, a narrowband, and/or the like.

The Reference Signal Received Quality (RSRQ) may use the number of used Resource Blocks (N) and may be defined as RSRQ=(N*RSRP)/RSSI measured over the same bandwidth. The RSRQ may indicate the quality of the received reference signal.

In some aspects, the RSRP (Reference Signal Receive Power) may be defined as the average power of Resource Elements (RE) that carry cell specific Reference Signals (RS) over the entire bandwidth.

In some aspects, data latency may be a time it takes for data to be transferred between its original source and its destination. For example, a time it takes for data to be transferred between the wireless device 100 and the wireless network 202.

In some aspects, jitter can be defined as a varied delay between received packets. For example, a varied delay between received packets transferred between the wireless device 100 and the wireless network 202.

In some aspects, data throughput can be defined as an amount of information that can be transmitted across an interface is often interchangeably referred to as "signaling rate," "data rate" or "throughput." For example, an amount of information that can be transmitted between the wireless device 100 and the wireless network 202.

In some aspects, some of the wireless service quality information may be measured by the transceiver 112 of the wireless device 100, the processor 118 of the wireless device 100, and/or the like. This information obtained by the wireless device 100 may be transmitted to the wireless network 202 and forwarded to the wireless service quality information platform 290. Other parts of the wireless service quality information may be measured by the transceivers of the wireless network 202, the radio access network (RAN) of the wireless network 202, the wireless service quality information platform 290, or other components of the wireless network 202 as described herein. In some aspects, the information obtained by the wireless network 202 may be forwarded to the wireless service quality information platform 290. In this regard, the wireless service quality information platform 290 may collect this information and store the collected wireless service quality information in the database for subsequent retrieval.

Figure 3:
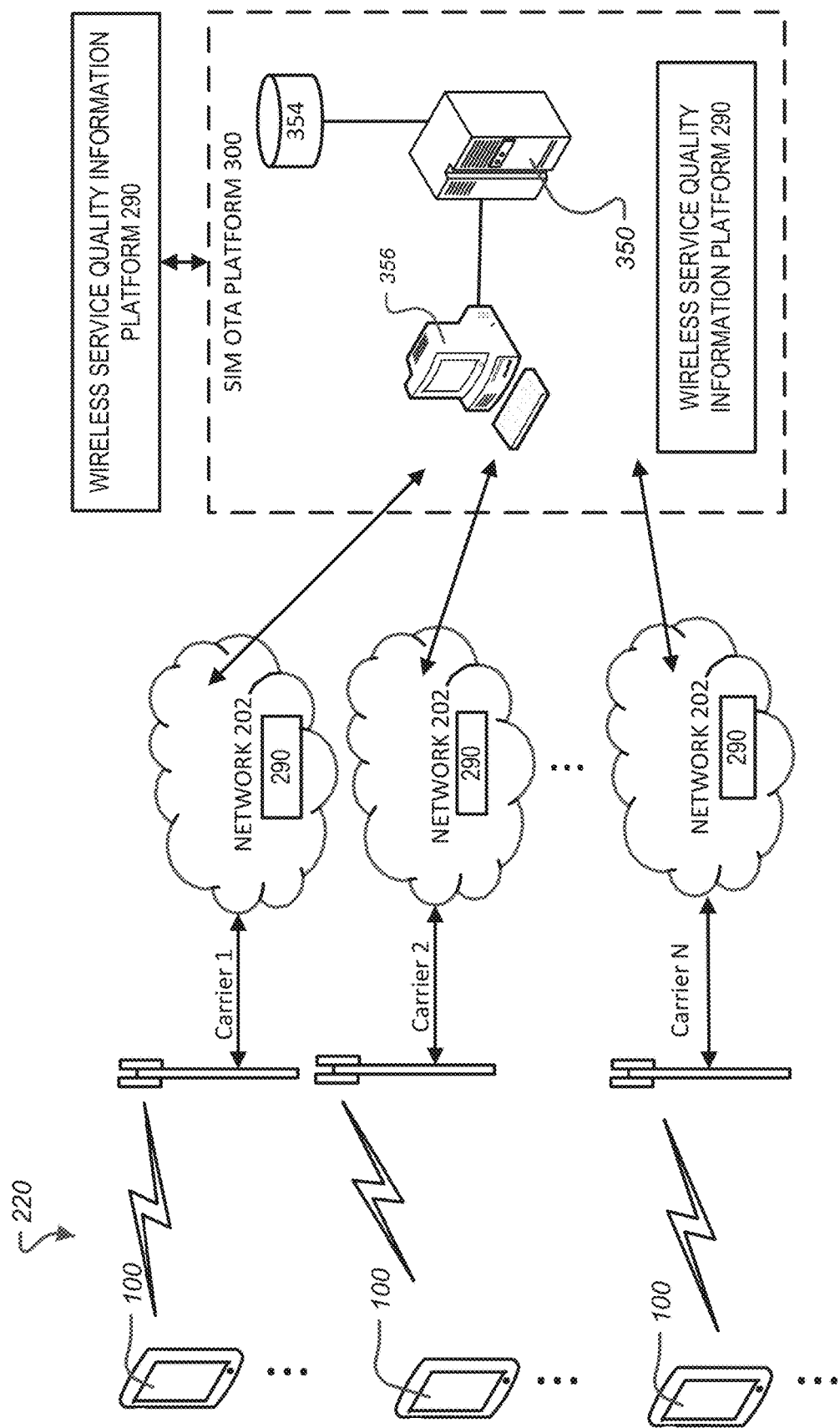
FIG. 3 illustrates a system as well as wireless devices that may connect with one of a plurality of networks and service providers in accordance with aspects of the disclosure.

FIG. 3 illustrates a system in which wireless devices may connect with one of a plurality of networks and service providers, in accordance with aspects of the disclosure.

In particular, FIG. 3 illustrates wireless devices 100 connecting to various implementations of the wireless networks 202. The various implementations of the wireless networks 202 may include one or more of the functions, components, and/or the like as described herein. The type of wireless service provided by the wireless networks 202 may include data, voice, text, SMS, and/or the like. The variety of available carriers associated with the one or more wireless networks 202 are represented in FIG. 3 by carrier 1, carrier 2, . . . carrier N. Where N is a positive integer. In other words, there may be N different wireless networks or carriers.

The dynamic roaming public land mobile network (PLMN) list implemented by the wireless device 100 and/or the SIM 132 may control which one of the N different wireless networks or carriers the wireless device 100 connects. In particular aspects, the wireless device 100 may operate and/or implement a public land mobile network (PLMN). In particular, the public land mobile network (PLMN) may implement, may be controlled by, and/or the like by a PLMN selector, a PLMN selection, a PLMN selecting process, and/or the like (for brevity PLMN selector). The PLMN selector may implement a list that prioritizes a PLMN or wireless network and an associated access technology. In other words, the PLMN selector may connect the wireless device 100 to a particular implementation of the wireless network 202 in view of the list that prioritizes a PLMN or wireless network and an associated access technology.

In this regard, one particular implementation of the wireless network 202 or carrier may implement a different allocation of wireless bands with respect to another implementation of the wireless network 202 or carrier. A wireless network 202 may have its own subscriber profile repository, which can verify a wireless user account associated with the wireless device 100. When the wireless device 100 has been authenticated on a wireless network 202, the wireless device 100 may connect to a gateway support node associated with the wireless network 202 to receive wireless services including data, voice, text, SMS, and/or other wireless services available to the wireless device 100 on the wireless network 202. The gateway support node may also operatively link the wireless device 100 to communicate billing and policy services associated with the wireless network 202. Additionally, each of the wireless networks 202 may include the wireless service quality information platform 290 and associated database implemented as described herein to collect wireless service quality information.

The system of FIG. 3 may further include a SIM OTA platform 300, which may employ a processor 350 to receive wireless service quality information from each of the wireless networks 202, the wireless service quality information platform 290, and/or the like and store the wireless service quality information in a database 354. In one aspect, the processor 350 may receive wireless service quality information from each implementation of the wireless service quality information platform 290 implemented by each wireless network 202 and store the wireless service quality information in the database 354. The processor 350 may implement one or more processors, servers, and/or the like. The SIM OTA platform 300 may be cloud-based, network-based, and/or the like. In one aspect, the SIM OTA platform 300 may be a wireless service quality information system. In one aspect, the processor 350 may be a wireless service quality information processor. In one aspect, the SIM OTA platform 300 may be implemented by a MVNO. In one aspect, the SIM OTA platform 300 may be implemented by an MNO. In one aspect, the SIM OTA platform 300 may be implemented by a third party.

In particular, the processor 350 may include an Application Programming Interface (API) and/or the SIM OTA platform 300 may include Application Programming Interface (API). More specifically, the processor 350 and the SIM OTA platform 300 may include one or more Application Programming Interfaces (API) such that the processor 350 receives the wireless service quality information from the wireless service quality information platform 290, the SIM OTA platform 300, the database 354, and/or the like of each of the wireless networks 202. The database 354 may receive the wireless service quality information from the wireless service quality information platform 290, the processor 350, the SIM OTA platform 300, and/or the like and store the same.

As noted above, the wireless service quality information may include one or more of the following: whether the wireless device 100 is registered to the Radio Access Network; a current cell tower identification (ID) that the wireless device 100 connects; a Location Area Code (LAC) for the wireless device 100; a signal strength (dB) for the wireless device 100 and/or the wireless network 202; a Signal-to-Noise Ratio (SNR) for the wireless device 100 and/or the wireless network 202; an LTE RSSI (Received Signal Strength Indicator) for the wireless device 100 and/or the wireless network 202; an LTE RSRQ (Reference Signal Received Quality) for the wireless device 100 and/or the wireless network 202; an LTE SINR (Signal to Interference & Noise Ratio) for the wireless device 100 and/or the wireless network 202; an LTE CQI (Channel Quality Indicator) for the wireless device 100 and/or the wireless network 202; a RSRP (Reference Signal Received Power) for the wireless device 100 and/or the wireless network 202; a data latency for the wireless device 100 and/or the wireless network 202; jitter for the wireless device 100 and/or the wireless network 202; a data throughput for the wireless device 100 and/or the wireless network 202; and/or the like.

Additionally, the wireless service quality information may include this information associated with each wireless subscriber. Accordingly, the database 354 may store the wireless service quality information together with an identification that associates it to each wireless subscriber and the wireless device 100 associated with each wireless subscriber. In particular, the database 354 may store user equipment information associated with each wireless subscriber. In particular, the user equipment information associated with each wireless subscriber may include the type of wireless device 100 being utilized by each wireless subscriber.

The processor 350 may be configured analyze the wireless service quality information at a per wireless subscriber level in order to troubleshoot wireless user technical problems, address business needs, and/or the like. For example, the processor 350 may be configured to analyze the wireless service quality information in order to better troubleshoot subscriber technical problems based on one or more of: the Signal Strength (dB), the Signal-to-Noise Ratio (SNR), the LTE RSSI (Received Signal Strength Indicator), the LTE RSRQ (Reference Signal Received Quality), the LTE SINR (Signal to Interference & Noise Ratio), the LTE CQI (Channel Quality Indicator), and the like in association with the geographic location of the subscriber and the type of wireless equipment.

The geographic location of the subscriber and/or the wireless device 100 may be based on a current cell tower identification (ID) that the wireless device 100 connects, a Location Area Code (LAC) for the wireless device 100, location information provided by the wireless device 100, and/or the like. The location information may be provided by the wireless device 100 and may be provided by a location determination device 130. The location information may be provided to the wireless network 202 and stored by the SIM OTA platform 300 in the database 354.

In this regard, the analysis by the processor 350 may include statistical analysis on the wireless service quality information to determine a mean, standard deviation, and the like for each type of the wireless service quality information. The statistical analysis may be associated with the geographic location of the wireless device 100 of a subscriber and/or associated with the type of wireless equipment.

Thereafter, the processor 350 may further determine causality, and in particular draw a conclusion on an effect of independent variables on dependent variables with respect to the wireless service quality information, the geographic location, and the wireless equipment type. More specifically, the wireless service quality information may be analyzed to ascertain whether wireless service from the wireless network 202 that is implementing a particular allocation of different bands and technologies operating at various uplink and downlink frequencies may be the cause for a particular implementation/operation of the wireless device 100 to have poor performance in a particular geographic location.

The processor 350 may alternatively and/or further utilize artificial intelligence. In some aspects, the processor 350 may utilize artificial intelligence to set and redefine thresholds of wireless service quality information to ascertain poor performance in order to determine whether implementing a particular allocation of different bands and technologies operating at various uplink and downlink frequencies may be the cause for a particular implementation/operation of the wireless device 100 to have poor performance in a particular geographic location.

The artificial intelligence may utilize any number of approaches including one or more of cybernetics and brain simulation, symbolic, cognitive simulation, logic-based, anti-logic, knowledge-based, sub-symbolic, embodied intelligence, computational intelligence and soft computing, machine learning and statistics, and the like.

The analysis generated by the processor 350 may include determining which combination of particular types of wireless devices 100, the wireless networks 202, and particular geographic locations result in poor performance.

In one aspect, poor performance relates to one of the factors of the wireless service quality information that is below a mean of one of the factors of the wireless service quality information for all wireless devices 100 and wireless networks 202.

In one aspect, poor performance relates to a plurality of the factors of the wireless service quality information that are below a mean of a plurality of the factors of the wireless service quality information for all wireless devices 100 and wireless networks 202.

In one aspect, poor performance relates to a majority of the factors of the wireless service quality information that are below a mean of the majority of the factors of the wireless service quality information for all wireless devices 100 and wireless networks 202.

In one aspect, poor performance relates to the factors of the wireless service quality information that are below a predetermined threshold of performance.

In one aspect, poor performance relates to one of the factors of the wireless service quality information that is below a predetermined threshold of performance.

In one aspect, poor performance relates to a plurality of the factors of the wireless service quality information that are below a predetermined threshold of performance.

In one aspect, poor performance relates to the majority of the factors of the wireless service quality information that are below a predetermined threshold of performance.

Performance may be based on the factors related to the wireless service quality information and geographic location of the wireless device 100. In other words, the processor 350 may determine which wireless devices 100 and associated wireless networks 202 operate poorly in particular geographic locations.

In a similar manner, the processor 350 may include determining which combination of particular types of wireless devices 100 and wireless networks 202 for particular geographic locations result in superior performance. For example, performance that is above the mean performance for all wireless devices 100 and wireless networks 202 as described above; and/or performance that is above a performance threshold as described above. In other words, the processor 350 may determine which wireless devices 100 and associated wireless networks 202 operate more effectively in particular geographic locations.

The processor 350 may further ascertain that a wireless device in a particular geographic location operating with poor performance with a first one of the wireless networks 202 may operate with improved performance if operated with a second one of the wireless networks 202. The analysis generated by the processor 350 may be output to a man machine interface 356 that may include a computer, a display, a printer, and/or the like. The analysis generated by the processor 350 may be output to a display device, a printer, transmitted over a network, and/or the like. In one aspect, the analysis generated by the processor 350 may be output to a display device to assist technical support to obtain solutions to address the poor performance. In one aspect, the analysis generated by the processor 350 may be transmitted over a network to assist technical support to obtain solutions to address the poor performance.

In additional aspects, the processor 350 may be utilized for various business implementations. For example, the processor 350 may determine whether the wireless device 100 is registered to the Radio Access Network. In this regard, the processor 350 may determine that a customer's wireless device 100 is attached to the wireless network 202, the processor 350 can utilize the above-noted statistical and/or artificial intelligence process to better understand a customer's behavior, determine whether to send or not send the customer over the air (OTA) marketing messages and the like. In one aspect, the marketing messages may include one or more of the following: text message marketing messages, SMS marketing messages, MMS marketing messages, in application marketing messages, email marketing messages, and the like.

In another aspect, the processor 350 may determine the current cell tower identification for a wireless device user. In this regard, the processor 350 can utilize the above-noted statistical and/or artificial intelligence processes to better understand a customer's behavior, know when and where they are using their wireless devices, concentrate marketing efforts, accordingly, analyze the impact of marketing efforts, and the like. This analysis and information results in the ability to provide superior service to customers.

In another aspect, the processor 350 may determine the Location Area Code (LAC) for a wireless device user. In this regard, the processor 350 can utilize the above-noted statistical and artificial intelligence processes to better understand a customer's behavior, know when and where they are using their wireless devices, concentrate marketing efforts, accordingly, analyze the impact of marketing efforts, and the like. Likewise, this analysis and information results in the ability to provide superior service to customers.

Figure 4:
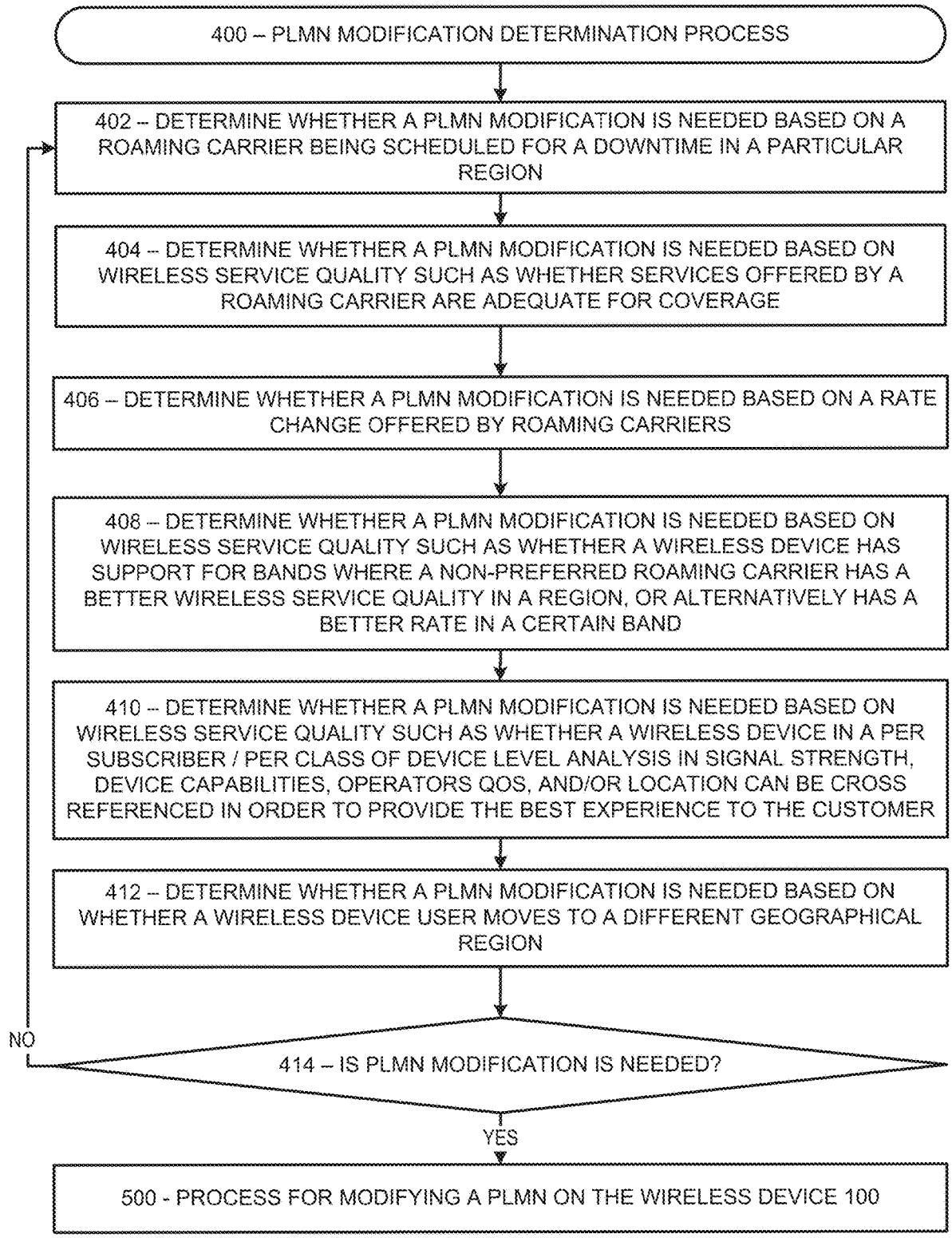
FIG. 4 illustrates a PLMN modification determination process, in accordance with aspects of the disclosure.

FIG. 4 illustrates a PLMN modification determination process, in accordance with aspects of the disclosure.

In particular, FIG. 4 illustrates a PLMN modification determination process 400. The PLMN modification determination process 400 may utilize any one or more of the features, implementations, and/or the like as disclosed herein. It should be noted that the aspects of the PLMN modification determination process 400 may be performed in a different order consistent with the aspects described herein. Moreover, the PLMN modification determination process 400 may be modified to have more or fewer processes consistent with the various aspects disclosed herein. The PLMN modification determination process 400 may be implemented at least in part by the SIM OTA platform 300, the wireless service quality information platform 290, the wireless network 202, an MVNO, and/or the like. The PLMN modification determination process 400 may be implemented at any point of time after activation, can be reviewed and modified once per billing period (per hour, per day, per week, per month, per year, and/or the like) for business rules to take effect, and/or the like.

The PLMN modification determination process 400 may include a process to determine whether a PLMN modification is needed based on a roaming carrier being scheduled for a downtime in a particular region 402. The downtime may be any type of activity that may result in reduced or limited wireless service provided by a particular carrier for particular geographic region. In this regard, the wireless network 202, the SIM OTA platform 300, the wireless service quality information platform 290, the MVNO, intelligence infrastructure, and/or the like may be provided wireless carrier service information that a roaming carrier being scheduled for a downtime in a particular region. In this regard, the wireless carrier service information may be information indicating reduced or limited wireless service provided by a particular carrier for particular geographic region. Based on this information, the wireless network 202, the SIM OTA platform 300, the wireless service quality information platform 290, the MVNO, intelligence infrastructure, and/or the like may determine a PLMN modification is needed. In particular, determine a PLMN modification is needed in order to ensure the wireless device 100 and the wireless user are provided with optimal wireless service.

For example, a roaming carrier higher in priority in a public land mobile network (PLMN) of the wireless device 100 is scheduled for a downtime. For example, a roaming carrier higher in priority in a public land mobile network (PLMN) is scheduled for a downtime in a particular region. In this regard, the wireless user may benefit from a dynamic roaming public land mobile network (PLMN) for their wireless device configured to address this downtime.

In one aspect, the SIM OTA platform 300 may store wireless subscriber identification information and wireless equipment information in a database, such as the database 354. When the SIM OTA platform 300 is implemented by a MVNO, this information is available from the wireless device identification information associated with subscriber accounts. In other aspects, this information can be obtained from the associated MNO or from the wireless network 202.

Additionally, the SIM OTA platform 300 and/or the wireless service quality information platform 290 may query the wireless networks 202 and receive wireless service quality information from the wireless networks 202 and store the wireless service quality information in the database 354. For example, the query may be implemented by the Application Programming Interface (API) and associated processes as described herein. In one aspect, the SIM OTA platform 300 and/or the wireless service quality information platform 290 may query each of the wireless networks 202 and receive wireless service quality information from the wireless networks 202 and store the wireless service quality information in the database 354.

Moreover, the SIM OTA platform 300 and/or the wireless service quality information platform 290 may query wireless networks and receive geographic location information from the wireless networks and store the geographic location information in the database 354. For example, the query may be implemented by the Application Programming Interface (API) and associated processes as described herein. In one aspect, the SIM OTA platform 300 and/or the wireless service quality information platform 290 may query each of the wireless networks 202 and receive geographic location information from the wireless networks 202 and store the wireless service quality information in the database 354.

Additionally, the SIM OTA platform 300 and/or the wireless service quality information platform 290 may analyze wireless service quality information, wireless equipment information, and geographic location information. In particular, the processor 350 and/or the wireless service quality information platform 290 may utilize the statistical and/or artificial intelligence processes as described herein.

In further aspects, the SIM OTA platform 300 and/or the wireless service quality information platform 290 may determine wireless subscribers having poor performance based on one or a combination of wireless network, wireless equipment, geographic location, and/or the like. In particular, the processor 350 and/or the wireless service quality information platform 290 may utilize the statistical and/or artificial intelligence processes as described herein.

Additionally, the SIM OTA platform 300 and/or the wireless service quality information platform 290 may determine wireless subscribers having superior performance based on one or a combination of wireless network and wireless equipment, geographic location, and/or the like. In particular, the processor 350 and/or the wireless service quality information platform 290 may utilize the statistical and/or artificial intelligence processes as described herein.

Moreover, the SIM OTA platform 300 and/or the wireless service quality information platform 290 may determine possible solutions to subscribers having poor performance that may include changing one or more of a wireless network, wireless equipment, and/or the like. In particular, the processor 350 and/or the wireless service quality information platform 290 may utilize the statistical and/or artificial intelligence processes as described herein.

Finally, the SIM OTA platform 300 may output information on wireless subscribers having poor performance and the possible solutions and/or implementing the possible solutions. In one aspect, the wireless user having poor performance in a particular geographic location may be advised to modify their wireless device and/or their wireless network to be consistent with a wireless user having superior performance in the same particular geographic location. The output information by the processor 350 may be output to the man machine interface 356 such as a display device, a printer, and the like, transmitted over a network, and/or the like. In one aspect, the information generated by the processor 350 may be output to the man machine interface 356 such as a display device to assist technical support to obtain solutions to address the poor performance. In one aspect, the output information generated by the processor 350 may be transmitted over network to assist technical support to obtain solutions to address the poor performance.

In one aspect, a solution to improving poor performance may be achieved by modifying a PLMN of the wireless device 100. Modifying the PLMN that the wireless device 100 utilizes may be implemented by a process for modifying a PLMN on the wireless device 500. The PLMN modification process may be performed at least in part by the SIM OTA platform 300. The SIM OTA platform 300 may determine that one or more wireless users would benefit from changing or modifying the PLMN. Thereafter, the SIM OTA platform 300 may implement changes to the PLMN for the wireless device 100.

The PLMN modification determination process 400 may include a process to determine whether a PLMN modification is needed based on whether services offered by a roaming carrier are adequate for coverage 404. In this regard, the wireless service quality information platform 290 may provide wireless service quality information to the SIM OTA platform 300. The SIM OTA platform 300 may analyze the wireless service quality information as described herein and may determine a PLMN modification is needed. In particular, determine a PLMN modification is needed in order to ensure the wireless device 100 and the wireless user are provided with optimal wireless service.

For example, the wireless services offered by a roaming carrier in terms of data throughput, latency, and/or the like are poor for user data. Additionally, the wireless services offered by a roaming carrier in terms of data throughput, latency, and/or the like are poor for user data, however the wireless services are adequate for coverage such as voice and SMS. In this regard, the wireless user may benefit from a dynamic roaming public land mobile network (PLMN) for their wireless device configured to address this poor wireless service.

The PLMN modification determination process 400 may include a process to determine whether a PLMN modification is needed based on rates offered by roaming carriers change 406. In this regard, the wireless network 202, the SIM OTA platform 300, the wireless service quality information platform 290, the MVNO, intelligence infrastructure, and/or the like may be provided information on rates offered by roaming carriers. Based on this information, the wireless network 202, the SIM OTA platform 300, the wireless service quality information platform 290, the MVNO, intelligence infrastructure, and/or the like may determine a PLMN modification is needed. In particular, determine a PLMN modification is needed in order to ensure the wireless device 100 and the wireless user are provided with cost-effective wireless service.

For example, the rates offered by roaming carriers may change, and the roaming carrier lower in the list of the public land mobile network (PLMN) may now offer a superior rate. In this regard, the wireless user and/or wireless carrier may benefit from a dynamic roaming public land mobile network (PLMN) for their wireless device configured to take advantage of wireless service having this superior rate. For example, such a carrier may be promoted higher in a priority listing utilizing the dynamic roaming public land mobile network (PLMN) of the disclosure.

The PLMN modification determination process 400 may include a process to determine whether a PLMN modification is needed based on whether a wireless device has support for bands where a non-preferred roaming carrier has a better service in a region, or alternatively has a better rate in a certain band 408. In this regard, the wireless service quality information platform 290 may provide wireless service quality information to the SIM OTA platform 300. The SIM OTA platform 300 may analyze the wireless service quality information as described herein and may determine a PLMN modification is needed. In particular, determine a PLMN modification is needed in order to ensure the wireless device 100 and the wireless user are provided with optimal wireless service.

For example, the wireless device may have support for certain wireless service bands where the non-preferred roaming carrier has better wireless service such as a better QOS (quality of service) in a region, has a better rate on a certain band, and/or the like. In this regard, the wireless user and/or wireless carrier may benefit from a dynamic roaming public land mobile network (PLMN) for their wireless device configured to take advantage of this better wireless service. For example, a MVNO may utilize a dynamic roaming public land mobile network (PLMN) configured to prioritize a roaming carrier having better wireless service for a class of devices and/or subscribers.

The PLMN modification determination process 400 may include a process to determine whether a PLMN modification is needed based on whether a wireless device in a per subscriber/per class of device level analysis where in signal strength, device capabilities, operators QOS, and location can be cross referenced in order to provide the best experience to the customer 410. In this regard, the wireless service quality information platform 290 may provide wireless service quality information to the SIM OTA platform 300. The SIM OTA platform 300 may analyze the wireless service quality information as described herein and may determine a PLMN modification is needed. In particular, determine a PLMN modification is needed in order to ensure the wireless device 100 and the wireless user are provided with optimal wireless service.

For example, data driven decisions that include changing the priority of roaming carriers, in a per subscriber/per class of wireless device level where signal strength, device capabilities, operator QOS, location, and/or the like can be determined, and cross referenced in order to provide the best experience to the customer. In this regard, the wireless user may benefit from a dynamic roaming public land mobile network (PLMN) configured for their wireless device to provide the best experience and/or best wireless service.

The PLMN modification determination process 400 may include a process to determine whether a PLMN modification is needed based on whether a wireless device user moves to a different geographical region 412. In this regard, the wireless service quality information platform 290 may provide wireless service quality information to the SIM OTA platform 300. The SIM OTA platform 300 may analyze the wireless service quality information as described herein and may determine a PLMN modification is needed. In particular, determine a PLMN modification is needed in order to ensure the wireless device 100 and the wireless user are provided with optimal wireless service.

For example, if a user of the wireless device moves to a different geographical region, the system for configuring a dynamic roaming public land mobile network (PLMN) and/or the process for configuring a dynamic roaming public land mobile network (PLMN) may allow only operators in that region to be downloaded on the SIM. In this regard, the user and/or the wireless device may be range bound to only operate in the pre-set geographical region.

Figure 5:
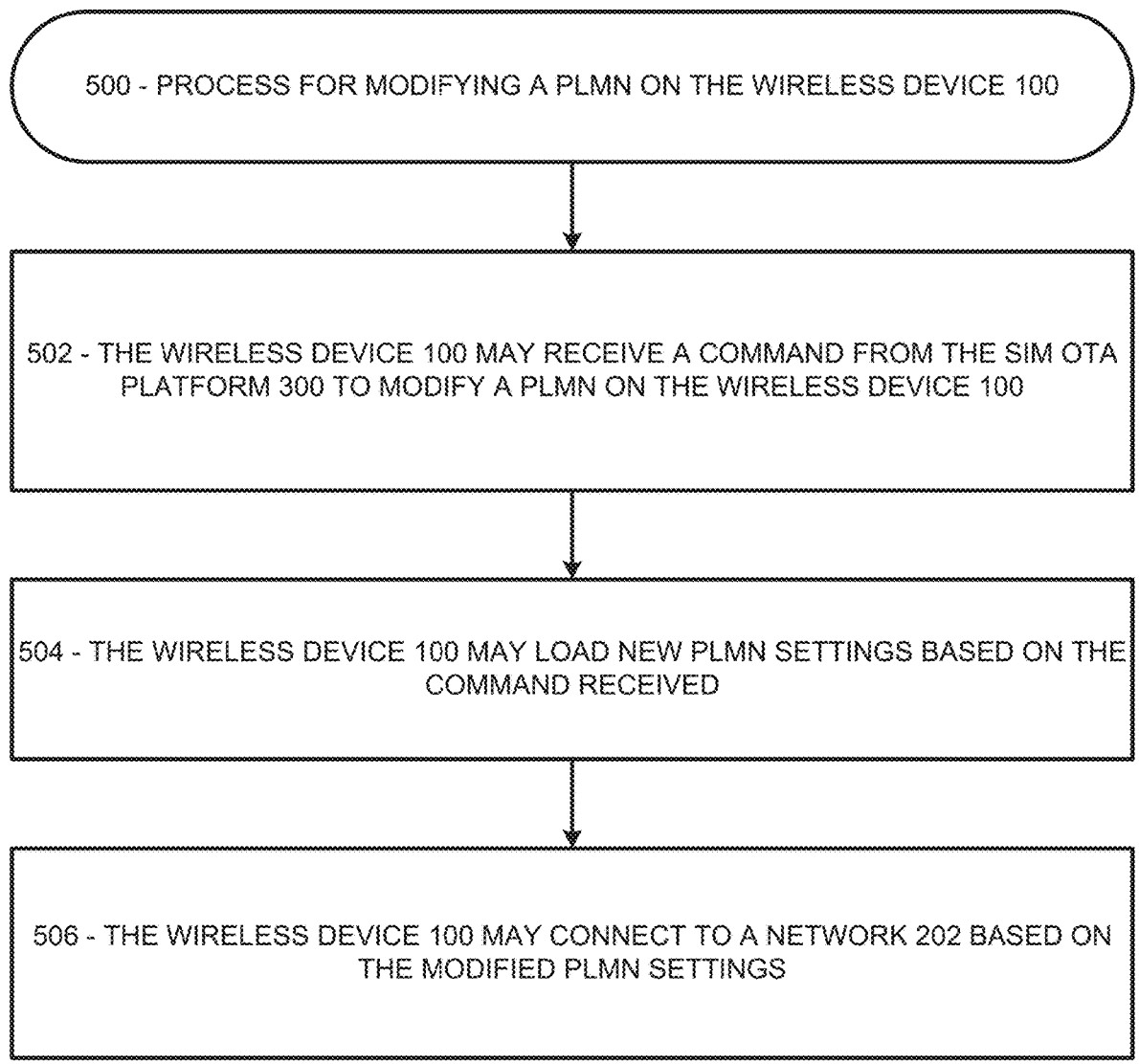
FIG. 5 illustrates a PLMN modification process for modifying wireless network access for a wireless device, in accordance with aspects of the disclosure.

The PLMN modification determination process 400 may include a process to determine whether a PLMN modification is needed 414. In particular, the PLMN modification determination process 400 may make this determination based on the above-noted process steps. If a PLMN modification is needed 414, the PLMN modification determination process 400 will advance to a process for modifying a PLMN on the wireless device 500 as illustrated in FIG. 5. If on the other hand, a PLMN modification is not needed, the PLMN modification determination process 400 will return to repeat the above-noted process steps.

Modifying a PLMN by the SIM OTA platform 300 for the wireless device 100 may include establishing a user profile and/or a general profile, each profile possibly based at least in part on a geographic location of the wireless device 100 and/or other factors such as type of wireless device 100 use. The profile data may be stored in the database 354. The SIM OTA platform 300 may modify a PLMN based on factors such as location, and may transmit those settings to the wireless device 100. In one example, at a particular time and/or location, the SIM OTA platform 300 may transmit to the wireless device 100 PLMN modification settings and/or profiles to implement on the wireless device 100. The wireless device 100 may receive those PLMN modification settings from the SIM OTA platform 300 through a connection to the wireless network 202, which may connect to the SIM OTA platform 300, and may implement those PLMN modification settings on the wireless device 100. The wireless device 100 may automatically implement the PLMN modification settings and/or profiles on the wireless device 100.

In a particular aspect, the PLMN modification application 122 may be configured to modify a PLMN to which the wireless device 100 connects. In one aspect, the PLMN modification application 122 may be configured to modify a PLMN to which the wireless device 100 connects by modifying a PLMN of a SIM 132. The processor 118 and/or the PLMN modification application 122 on the wireless device 100 may modify the PLMN on the wireless device 100 so that the wireless device 100 connects to the wireless network 202 based on the PLMN modification determination process 400 described above and/or on a variety of factors such as time, location, type of wireless device 100 use, cost, MVNO preference, and the like.

In one aspect, the PLMN modification application 122 may modify PLMN on the wireless device 100 with the processor 118 and/or the PLMN modification application 122 in response to instructions from the processor 350 of the SIM OTA platform 300. In one aspect, the PLMN modification application 122 may modify a PLMN on the wireless device 100 with the processor 118 and/or the PLMN modification application 122 in response to instructions from the processor 350 of the SIM OTA platform 300 utilizing Over-the-Air (OTA) programming.

In one aspect, the OTA may include various methods of modifying a PLMN, distributing new software, modifying configuration settings, updating encryption keys, and the like. In one aspect, the OTA may include one or more of over-the-air service provisioning (OTASP), over-the-air provisioning (OTAP), over-the-air parameter administration (OTAPA), provisioning the wireless device 100 with settings with which to access services such as wireless access point (WAP), MMS, and/or the like.

FIG. 5 illustrates a PLMN modification process for modifying wireless network access for a wireless device, in accordance with aspects of the disclosure.

FIG. 5 illustrates a process for modifying a PLMN on the wireless device 500 using the wireless device 100 once the PLMN modification settings have been determined and have been received by the wireless device 100. It should be noted that the aspects of the modifying a PLMN on the wireless device 500 may be performed in a different order consistent with the aspects described herein. Moreover, the modifying a PLMN on the wireless device 500 may be modified to have more or fewer processes consistent with the various aspects disclosed herein.

In particular, FIG. 5 illustrates the modifying a PLMN on the wireless device 500 that may be implemented at least in part by the SIM OTA platform 300, the processor 350, the database 354, and/or a similar system. In one aspect, the modifying a PLMN on the wireless device 500, the processor 350, and/or the database 354 may be implemented by a MVNO. In one aspect, the modifying a PLMN on the wireless device 500, the processor 350, and/or the database 354 may be implemented by an MNO. In one aspect, the modifying a PLMN on the wireless device 500, the processor 350, and/or the database 354 may be implemented by a third party.

Starting at box 502, the wireless device 100 may receive a command from the processor 350 to modify the PLMN of the wireless device 100. The command from the processor 350 may be any type of communication that the PLMN modification application 122 or the wireless device 100 is responsive. For example, the command may be an over the air (OTA) communication, an application push, an application pull, SMS communication, and/or the like. For example, the command may be an over-the-air service provisioning (OTASP), over-the-air provisioning (OTAP), over-the-air parameter administration (OTAPA), and/or the like provisioning of the necessary PLMN with which to access services from a desired wireless network 202.

The PLMN modification application 122 may be configured as a provisioning client capable of receiving, processing and setting the parameters associated with modifying a PLMN. For example, the PLMN modification application 122 may be a Device Management client capable of receiving and provisioning applications, connectivity parameters, and/or the like. In general, the term OTA implies the use of wireless mechanisms to send provisioning data or update packages for firmware or software updates to the wireless device 100 to modify a PLMN.

The modifying a PLMN on the wireless device 500 may continue to box 504 where the wireless device 100 may load a new PLMN based on the command received at box 502. The new PLMN may be based on the profiles generated by the SIM OTA platform 300. The new PLMN may also be based on the location and/or time of the wireless device 100, and/or based on the type of use of the wireless device 100 is desired.

Next the modifying a PLMN on the wireless device 500 may proceed to box 506 where the wireless device 100 may connect to the new one of the wireless networks 202 based on the new PLMN loaded by the wireless device 100 at box 504.

Thus, the disclosure has set forth a system and process that allows a wireless device to obtain optimal wireless service and not be limited to wireless service controlled by a limited static set of configurations or public land mobile network (PLMN). Additionally, the disclosure has set forth a system and process that allows a wireless service provider to control wireless service for a wireless device and not be limited to wireless service controlled by a limited static set of configurations or public land mobile network (PLMN).

The disclosed subject matter may allow wireless providers to troubleshoot technical issues, modify a PLMN for wireless device users, and the like based on a variety of data associated with the use of wireless devices on multiple networks. The optimization of wireless services across multiple wireless networks and carriers may improve the experience of users of wireless service plans that allow wireless service across multiple networks. The following are a number of nonlimiting Examples of aspects of the disclosure. One example includes EXAMPLE 1. A system configured to implement a dynamic roaming public land mobile network (PLMN) for at least one wireless network and at least one wireless device, the system includes: a processor configured to determine that at least one wireless device would benefit from modification of a public land mobile network (PLMN) based on at least one of the following: the at least one wireless device having poor wireless service performance, a change in wireless service rates for a wireless service carrier, reduced wireless service from a wireless service carrier, and a change in geographic location of a user of the at least one wireless device; and the processor further configured to update a public land mobile network (PLMN) for the least one wireless device based on at least one of the following: the at least one wireless device having poor wireless service performance, a change in wireless service rates for a wireless service carrier, reduced wireless service from a wireless service carrier, and a change in geographic location of a user of the at least one wireless device.

The above-noted EXAMPLE 1 may further include any one or a combination of more than one of the following EXAMPLES: 2. The system configured to implement a dynamic roaming public land mobile network (PLMN) for at least one wireless network and at least one wireless device of EXAMPLE 1, where: the processor is further configured to send a command to modify the public land mobile network (PLMN) for the at least one wireless device. 3. The system configured to implement a dynamic roaming public land mobile network (PLMN) for at least one wireless network and at least one wireless device of EXAMPLE 2, where: the command includes an over the air command to the at least one wireless device that modifies the public land mobile network (PLMN). 4. The system configured to implement a dynamic roaming public land mobile network (PLMN) for at least one wireless network and at least one wireless device of EXAMPLE 2, where: the at least one wireless device includes a wireless transceiver configured to receive the command from the processor to modify the public land mobile network (PLMN); and the wireless device includes a wireless processor configured to modify the public land mobile network (PLMN) in response to the command received from the processor. 5. The system configured to implement a dynamic roaming public land mobile network (PLMN) for at least one wireless network and at least one wireless device of EXAMPLE 1, includes: the processor being configured to receive wireless service quality information from at least one wireless network for the at least one wireless device; a database configured to store the wireless service quality information; the processor further configured to analyze the wireless service quality information: and the processor further configured to determine that the at least one wireless device would benefit from modification of a public land mobile network (PLMN). 6. The system configured to implement a dynamic roaming public land mobile network (PLMN) for at least one wireless network and at least one wireless device of EXAMPLE 5 where: the processor is further configured to determine whether the wireless device having poor wireless service performance is caused by a wireless equipment type or by the at least one wireless network based on analysis of the wireless service quality information. 7. The system configured to implement a dynamic roaming public land mobile network (PLMN) for at least one wireless network and at least one wireless device of EXAMPLE 6, where: the wireless service quality information is received by the processor from the at least one wireless network from at least one of the following: a switch implemented by the at least one wireless network, a Home Location Register (HLR) implemented by the at least one wireless network, a home subscriber server (HSS) implemented by the at least one wireless network, a Unified Data Management (UDM) implemented by the at least one wireless network, a wireless service quality information processor implemented by the at least one wireless network, a wireless service quality information server implemented by the at least one wireless network, and the at least one wireless device that is receiving wireless service from the at least one wireless network. 8. The system configured to implement a dynamic roaming public land mobile network (PLMN) for at least one wireless network and at least one wireless device of EXAMPLE 6, where: the wireless service quality information includes at least one of the following: whether the at least one wireless device is registered to a Radio Access Network, a current cell tower identification (ID) that the at least one wireless device connects, a Location Area Code (LAC) for the at least one wireless device, a signal strength (dB) for the at least one wireless device, and/or the at least one wireless network, a Signal-to-Noise Ratio (SNR) for the at least one wireless device and/or the at least one wireless network, an LTE RSSI (Received Signal Strength Indicator) for the at least one wireless device and/or the at least one wireless network, an LTE RSRQ (Reference Signal Received Quality) for the at least one wireless device and/or the at least one wireless network, an LTE SINR (Signal to Interference & Noise Ratio) for the at least one wireless device and/or the at least one wireless network, an LTE CQI (Channel Quality Indicator) for the at least one wireless device and/or the at least one wireless network, a RSRP (Reference Signal Received Power) for the at least one wireless device and/or the at least one wireless network, a data latency for the at least one wireless device and/or the at least one wireless network, jitter for the at least one wireless device and/or the at least one wireless network, and a data throughput for the at least one wireless device and/or the at least one wireless network. 9. The system configured to implement a dynamic roaming public land mobile network (PLMN) for at least one wireless network and at least one wireless device of EXAMPLE 1, includes: the processor being further configured to receive geographic location information from the at least one wireless network for the at least one wireless device; a database configured to store the geographic location information related to the at least one wireless device: the processor further configured to analyze the geographic location information related to the at least one wireless device; and the processor further configured to determine that at least one wireless device would benefit from modification of a public land mobile network (PLMN). 10. The system configured to implement a dynamic roaming public land mobile network (PLMN) for at least one wireless network and at least one wireless device of EXAMPLE 9, where: the geographic location information includes at least one of the following: a current cell tower identification (ID) that the at least one wireless device connects, a Location Area Code (LAC) for the at least one wireless device, and a location determined by a global navigation satellite system (GNSS) with a location determination device implemented by the at least one wireless device. 11. The system configured to implement a dynamic roaming public land mobile network (PLMN) for at least one wireless network and at least one wireless device of EXAMPLE 1, includes: the processor being further configured to receive wireless carrier service information indicating reduced or limited wireless service provided by a particular carrier for particular geographic region; a database configured to store the wireless carrier service information related to the at least one wireless device; the processor further configured to analyze the wireless carrier service information related to the at least one wireless device; and the processor further configured to determine that at least one wireless device would benefit from modification of a public land mobile network (PLMN). 12. The system configured to implement a dynamic roaming public land mobile network (PLMN) for at least one wireless network and at least one wireless device of EXAMPLE 1, includes: the processor being configured to receive wireless service quality information from at least one wireless network for the at least one wireless device; the processor being further configured to receive geographic location information from the at least one wireless network for the at least one wireless device; the processor being further configured to receive wireless carrier service information indicating reduced or limited wireless service provided by a particular carrier for particular geographic region; a database configured to store the wireless service quality information, the geographic location information, the wireless carrier service information and equipment type information related to the at least one wireless device; the processor further configured to analyze the wireless service quality information, the geographic location information, the wireless carrier service information, and the equipment type information related to the at least one wireless device; and the processor further configured to determine that at least one wireless device would benefit from modification of a public land mobile network (PLMN).

One example includes EXAMPLE 13. A process for implementing a dynamic roaming public land mobile network (PLMN) for at least one wireless network and at least one wireless device, the process includes: determining with a processor that at least one wireless device would benefit from modification of a public land mobile network (PLMN) based on at least one of the following: the at least one wireless device having poor wireless service performance, a change in wireless service rates for a wireless service carrier, reduced wireless service from a wireless service carrier, and a change in geographic location of a user of the at least one wireless device; and updating with the processor a public land mobile network (PLMN) for the least one wireless device based on at least one of the following: the at least one wireless device having poor wireless service performance, a change in wireless service rates for a wireless service carrier, reduced wireless service from a wireless service carrier, and a change in geographic location of a user of the at least one wireless device.

The above-noted EXAMPLE 13 may further include any one or a combination of more than one of the following EXAMPLES: 14. The process for implementing a dynamic roaming public land mobile network (PLMN) for at least one wireless network and at least one wireless device of EXAMPLE 13, includes: sending with the processor a command to modify the public land mobile network (PLMN) for the at least one wireless device. 15. The process for implementing a dynamic roaming public land mobile network (PLMN) for at least one wireless network and at least one wireless device of EXAMPLE 14, where: the command includes an over the air command to the at least one wireless device that modifies the public land mobile network (PLMN). 16. The process for implementing a dynamic roaming public land mobile network (PLMN) for at least one wireless network and at least one wireless device of EXAMPLE 14, includes: receiving with the at least one wireless device that includes a wireless transceiver the command from the processor to modify the public land mobile network (PLMN); and modifying with the wireless device that includes a wireless processor the public land mobile network (PLMN) in response to the command received from the processor. 17. The process for implementing a dynamic roaming public land mobile network (PLMN) for at least one wireless network and at least one wireless device of EXAMPLE 13, includes: receiving with the processor wireless service quality information from at least one wireless network for the at least one wireless device; storing in a database the wireless service quality information; analyzing with the processor the wireless service quality information; and determining with the processor that the at least one wireless device would benefit from modification of a public land mobile network (PLMN). 18. The process for implementing a dynamic roaming public land mobile network (PLMN) for at least one wireless network and at least one wireless device of EXAMPLE 17 includes: determining with the processor whether the wireless device having poor wireless service performance is caused by a wireless equipment type or by the at least one wireless network based on analysis of the wireless service quality information. 19. The process for implementing a dynamic roaming public land mobile network (PLMN) for at least one wireless network and at least one wireless device of EXAMPLE 18, includes: receiving by the processor from the at least one wireless network the wireless service quality information from at least one of the following: a switch implemented by the at least one wireless network, a Home Location Register (HLR) implemented by the at least one wireless network, a home subscriber server (HSS) implemented by the at least one wireless network, a Unified Data Management (UDM) implemented by the at least one wireless network, a wireless service quality information processor implemented by the at least one wireless network, a wireless service quality information server implemented by the at least one wireless network, and the at least one wireless device that is receiving wireless service from the at least one wireless network. 20. The process for implementing a dynamic roaming public land mobile network (PLMN) for at least one wireless network and at least one wireless device of EXAMPLE 18, where: the wireless service quality information includes at least one of the following: whether the at least one wireless device is registered to a Radio Access Network, a current cell tower identification (ID) that the at least one wireless device connects, a Location Area Code (LAC) for the at least one wireless device, a signal strength (dB) for the at least one wireless device, and/or the at least one wireless network, a Signal-to-Noise Ratio (SNR) for the at least one wireless device and/or the at least one wireless network, an LTE RSSI (Received Signal Strength Indicator) for the at least one wireless device and/or the at least one wireless network, an LTE RSRQ (Reference Signal Received Quality) for the at least one wireless device and/or the at least one wireless network, an LTE SINR (Signal to Interference & Noise Ratio) for the at least one wireless device and/or the at least one wireless network, an LTE CQI (Channel Quality Indicator) for the at least one wireless device and/or the at least one wireless network, a RSRP (Reference Signal Received Power) for the at least one wireless device and/or the at least one wireless network, a data latency for the at least one wireless device and/or the at least one wireless network, jitter for the at least one wireless device and/or the at least one wireless network, and a data throughput for the at least one wireless device and/or the at least one wireless network. 21. The process for implementing a dynamic roaming public land mobile network (PLMN) for at least one wireless network and at least one wireless device of EXAMPLE 13, includes: receiving with the processor geographic location information from the at least one wireless network for the at least one wireless device; storing in a database the geographic location information related to the at least one wireless device; analyzing with the processor the geographic location information related to the at least one wireless device; and determining with the processor that at least one wireless device would benefit from modification of a public land mobile network (PLMN). 22. The process for implementing a dynamic roaming public land mobile network (PLMN) for at least one wireless network and at least one wireless device of EXAMPLE 21, where: the geographic location information includes at least one of the following: a current cell tower identification (ID) that the at least one wireless device connects, a Location Area Code (LAC) for the at least one wireless device, and a location determined by a global navigation satellite system (GNSS) with a location determination device implemented by the at least one wireless device. 23. The process for implementing a dynamic roaming public land mobile network (PLMN) for at least one wireless network and at least one wireless device of EXAMPLE 13, includes: receiving with the processor wireless carrier service information indicating reduced or limited wireless service provided by a particular carrier for particular geographic region; storing in a database the wireless carrier service information related to the at least one wireless device; analyzing with the processor the wireless carrier service information related to the at least one wireless device; and determining with the processor that at least one wireless device would benefit from modification of a public land mobile network (PLMN). 24. The process for implementing a dynamic roaming public land mobile network (PLMN) for at least one wireless network and at least one wireless device of EXAMPLE 13, includes: receiving with the processor wireless service quality information from at least one wireless network for the at least one wireless device; receiving with the processor geographic location information from the at least one wireless network for the at least one wireless device; receiving with the processor wireless carrier service information indicating reduced or limited wireless service provided by a particular carrier for particular geographic region; storing in a database the wireless service quality information, the geographic location information, the wireless carrier service information and equipment type information related to the at least one wireless device; analyzing with the processor the wireless service quality information, the geographic location information, the wireless carrier service information, and the equipment type information related to the at least one wireless device; and determining with the processor that at least one wireless device would benefit from modification of a public land mobile network (PLMN).

Further in accordance with various aspects of the disclosure, the methods described herein are intended for operation with dedicated hardware implementations including, but not limited to processors, microprocessors, wireless device chipsets, PCs, PDAs, SIM cards, semiconductors, application specific integrated circuits (ASIC), programmable logic arrays, cloud computing devices, and other hardware devices constructed to implement the methods described herein.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The wireless networks 202 may include a Mobility Management Entity (MME). The MME may function as a key control-node. The MME may be responsible for idle mode of the wireless device 100 as well as paging and tagging procedures including retransmissions. The MME may be involved in the bearer activation/deactivation process and may also responsible for choosing a Signaling Gateway (SGW) for the wireless device 100 at the initial attach and at a time of intra-LTE handover involving Core Network (CN) node relocation. The MME may be responsible for authenticating the wireless device 100 by interacting with a home subscriber server (HSS) and/or Unified Data Management (UDM). Non Access Stratum (NAS) signaling may terminate at the MME and may also be responsible for generation and allocation of temporary identities to the wireless device 100. The MME may check the authorization of the wireless device 100 to camp on the service provider's Public Land Mobile Network (PLMN) and may enforce roaming restrictions on the wireless device 100. The MME may be a termination point in the wireless network 202 for ciphering/integrity protection for NAS signaling and may handle the security key management. The MME may also provide a control plane function for mobility between LTE and 2G/3G access networks with an S3 interface terminating at the MME from the Serving GPRS Support Node (SGSN). The MME may also terminate an S6a interface towards the home HSS for a roaming wireless device 100.

The SGW may be implemented as a network component responsible for transferring signaling messages (i.e. information related to call establishment, billing, location, short messages, address conversion, and other services) between Common Channel Signaling (CCS) nodes that communicate using different protocols and transports.

Each of the plurality of wireless networks 202 may include a public data network (PDN) gateway (PDN GW). The PDN GW may contain devices such as protocol translators, impedance matching devices, rate converters, fault isolators, or signal translators as necessary to provide system interoperability. The PDN GW may also require the establishment of mutually acceptable administrative procedures between networks.

The PDN may be a circuit-switched or packet-switched network that can transmit data in digital form. The PDN may provide any of X.25, frame relay, cell relay (ATM), and/or the like services. Access to a PDN generally includes a guaranteed bandwidth, known as the committed information rate (CIR).

The wireless network 202 may include an S5/S8 interface that may be used within the Evolved Packet Core (EPC) for LTE. The S5 interface may provide user plane tunneling and tunnel management between a serving GW and PDN GW. It may be used for Serving GW relocation due to the wireless device 100 mobility and if the serving GW needs to connect to a non-collocated PDN GW for the required PDN connectivity.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may include, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

The disclosure may include communication channels 220 that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), EVolution-Data Optimized (EVDO), 4G, 5G, and/or the like, and/or a combination of two or more thereof.

The PLMN modification application 122 described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system and/or the like. The application may be displayed as an icon. The application may have been downloaded from the Internet, pre-installed, and/or the like. In some aspects, the application may be obtained from Google Play™, Android Market™, Apple Store™, and/or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system, and/or the like.

The disclosure may be implemented in any type of computing devices or processor, such as, e.g., a microprocessor, wireless device chipset, a desktop computer, personal computer, a laptop/mobile computer, a personal data assistant (PDA), a mobile phone, a tablet computer, cloud computing device, and the like, with wired/wireless communications capabilities via the communication channels 220.

In an aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system and/or the like.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

The term text, text message, or SMS refers to "short message service" which is a text messaging service component of phone, web, or mobile communication systems. It uses standardized communications protocols to allow fixed line or mobile phone devices to exchange short text messages. SMS was originally designed as part of GSM, but is now available on a wide range of networks, including 3G, 4G, LTE, 5G, and the like networks or networks associated with the communication channel as defined herein. In other aspects, text message may include Multimedia Messaging Service (MMS), which is a standard way to send messages that include multimedia content to and from mobile phones. It extends the core SMS (Short Message Service) capability that allowed exchange of text messages only up to 160 characters in length. While the most popular use is to send photographs from camera-equipped handsets, it is also used as a method of delivering news and entertainment content including videos, pictures, text pages, and ringtones. MMS can be used within the context of the disclosure for UICC activation message delivery. Of note is that MMS messages are delivered in a completely different way from SMS. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC (Multimedia Messaging Service Centre). If the receiver is on another carrier, the relay forwards the message to the recipient's carrier using the Internet.

The term talk, voice, or voice calls as utilized herein may include voice calls defined by 3GPP (3rd Generation Partnership Project) with Voice Call Continuity (VCC) specifications in order to describe how a voice call can be persisted, as a mobile phone moves between circuit switched and packet switched radio domains (3GPP TS 23.206).

The term data as utilized herein includes mobile broadband or wireless Internet access delivered through mobile phone towers over a communication channel as defined herein to computers, mobile phones, wireless devices, and other digital devices as defined herein using portable modems. Some mobile services allow more than one device to be connected to the Internet using a single cellular connection using a process called tethering.

Aspects of the disclosure include an Application Programming Interface (API). The API may include a set of subroutine definitions, protocols, and tools for building software. The set may include a set of defined methods of communication between the various components of the disclosure. The API may be implemented as a web-based system, an operating system, a database system, a computer hardware, a software library, and/or the like. The API may include an API specification that may include specifications for routines, data structures, object classes, variables, remote calls, and/or the like. The API may be associated with or related to a software library. The API may describe and prescribe the expected behavior as a set of rules and the software library may be an implementation of this set of rules. In one aspect, the API may be a remote API configured to manipulate remote resources through protocols, specific standards for communication, and/or the like that allow different technologies to work together, regardless of language or platform. In one aspect, the API may be POSIX, Windows API. In one aspect, the API may be ASPI. In one aspect, the API may be Java API. In one aspect, the API may be Java Database Connectivity API.

While the device, system, and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A system configured to implement a dynamic roaming public land mobile network (PLMN), the system comprising a processor configured to:
receive at a processor at least one of: (i) wireless service quality information from a wireless network for at least one wireless device, (ii) wireless service rates for a wireless carrier, (iii) wireless carrier service information indicating reduced wireless service provided by a carrier for a geographic region; and (iv) geographic location information from the wireless network for at least one wireless device;
determine that at least one wireless device would benefit from modification of the PLMN based on at least one of: (i) the wireless service quality information, (ii) a change in wireless service rates for a wireless service carrier, (iii) reduced wireless service from a wireless service carrier, and (iv) a change in geographic location of a user of the at least one wireless device; and
update the PLMN for the least one wireless device based on at least one of: (i) the service quality information, (ii) the change in wireless service rates for the wireless service carrier, (iii) reduced wireless service from the wireless service carrier, and (iv) the change in geographic location of the user of the at least one wireless device.

2. The system configured to implement the dynamic roaming PLMN of claim 1, wherein:
the processor is further configured to send a command to modify the PLMN for the at least one wireless device, the at least one wireless device comprising:
a wireless transceiver configured to receive the command from the processor to modify the PLMN; and
a wireless processor configured to modify the PLMN in response to the command received from the processor.

3. The system configured to implement the dynamic roaming PLMN of claim 2, wherein:
the command comprises an over-the-air (OTA) command to the at least one wireless device that modifies the PLMN.

4. The system configured to implement the dynamic roaming PLMN of claim 2, wherein:
the at least one wireless devices includes a wireless transceiver configured to receive the command from the processor to modify the PLMN; and
the wireless device includes a wireless processor configured to modify the PLMN in response to the command received from the processor.

5. The system configured to implement the dynamic roaming PLMN of claim 4, wherein:
the wireless service quality information is received by the processor from the at least one wireless network from at least one of: a switch implemented by the at least one wireless network, a Home Location Register (HLR) implemented by the at least one wireless network, a home subscriber server (HSS) implemented by the at least one wireless network, a Unified Data Management (UDM) implemented by the at least one wireless network, a wireless service quality information processor implemented by the at least one wireless network, a wireless service quality information server implemented by the at least one wireless network, and the at least one wireless device that is receiving wireless service from the at least one wireless network.

6. The system configured to implement the dynamic roaming PLMN of claim 4, wherein:
the wireless service quality information comprises at least one of: whether the at least one wireless device is registered to a Radio Access Network, a current cell tower identification (ID) that the at least one wireless device connects, a Location Area Code (LAC) for the at least one wireless device, a signal strength (dB) for the at least one wireless device, and/or the at least one wireless network, a Signal-to-Noise Ratio (SNR) for the at least one wireless device and/or the at least one wireless network, an LTE RSSI (Received Signal Strength Indicator) for the at least one wireless device and/or the at least one wireless network, an LTE RSRQ (Reference Signal Received Quality) for the at least one wireless device and/or the at least one wireless network, an LTE SINR (Signal to Interference & Noise Ratio) for the at least one wireless device and/or the at least one wireless network, an LTE CQI (Channel Quality Indicator) for the at least one wireless device and/or the at least one wireless network, a RSRP (Reference Signal Received Power) for the at least one wireless device and/or the at least one wireless network, a data latency for the at least one wireless device and/or the at least one wireless network, jitter for the at least one wireless device and/or the at least one wireless network, and a data throughput for the at least one wireless device and/or the at least one wireless network.

7. The system configured to implement the dynamic roaming PLMN of claim 1, further comprising:
the processor being further configured to receive geographic location information from the at least one wireless network for the at least one wireless device;
a database configured to store the geographic location information related to the at least one wireless device;
the processor further configured to analyze the geographic location information related to the at least one wireless device; and
the processor further configured to determine that at least one wireless device would benefit from modification of the PLMN.

8. The system configured to implement the dynamic roaming PLMN of claim 7, wherein:
the geographic location information comprises at least one of: a current cell tower identification (ID) that the at least one wireless device connects, a Location Area Code (LAC) for the at least one wireless device, and a location determined by a global navigation satellite system (GNSS) with a location determination device implemented by the at least one wireless device.

9. The system configured to implement the dynamic roaming PLMN of claim 1, further comprising:
the processor being further configured to receive wireless carrier service information indicating reduced or limited wireless service provided by a particular carrier for particular geographic region;
a database configured to store the wireless carrier service information related to the at least one wireless device;

the processor further configured to analyze the wireless carrier service information related to the at least one wireless device; and the processor further configured to determine that at least one wireless device would benefit from modification of a public land mobile network (PLMN).

10. The system configured to implement the dynamic roaming PLMN of claim 1, further comprising:

the processor being configured to receive wireless service quality information from at least one wireless network for the at least one wireless device;

the processor being further configured to receive geographic location information from the at least one wireless network for the at least one wireless device;

the processor being further configured to receive wireless carrier service information indicating reduced or limited wireless service provided by a particular carrier for particular geographic region;

a database configured to store the wireless service quality information, the geographic location information, the wireless carrier service information and equipment type information related to the at least one wireless device;

the processor further configured to analyze the wireless service quality information, the geographic location information, the wireless carrier service information, and the equipment type information related to the at least one wireless device; and the processor further configured to determine that at least one wireless device would benefit from modification of a public land mobile network (PLMN).

11. A process for implementing a dynamic roaming public land mobile network (PLMN) for at least one wireless network and at least one wireless device, the process comprising:

receiving at a processor at least one of: (i) wireless service quality information from a wireless network for at least one wireless device, (ii) wireless service rates for a wireless carrier, (iii) wireless carrier service information indicating reduced wireless service provided by a carrier for a geographic region; and (iv) geographic location information from the wireless network for at least one wireless device;

determining with a processor that at least one wireless device would benefit from modification of the PLMN based on at least one of: (i) the wireless service quality information, (ii) a change in wireless service rates for a wireless service carrier, (iii) reduced wireless service from a wireless service carrier, and (iv) a change in geographic location of a user of the at least one wireless device; and updating the PLMN for the least one wireless device based on at least one of: (i) the service quality information, (ii) the change in wireless service rates for the wireless service carrier, (iii) reduced wireless service from the wireless service carrier, and (iv) the change in geographic location of the user of the at least one wireless device.

12. The process for implementing the dynamic roaming PLMN of claim 11, further comprising:

sending with the processor a command to modify the public land mobile network (PLMN) for the at least one wireless device.

13. The process for implementing the dynamic roaming PLMN of claim 12, wherein:

the command comprises an over-the-air (OTA) command to the at least one wireless device that modifies the public land mobile network (PLMN).

14. The process for implementing the dynamic roaming PLMN of claim 12, further comprising:

receiving with the at least one wireless device that includes a wireless transceiver the command from the processor to modify the public land mobile network (PLMN); and modifying with the wireless device that includes a wireless processor the public land mobile network (PLMN) in response to the command received from the processor.

15. The process for implementing the dynamic roaming PLMN of claim 14, further comprising:

receiving by the processor from the at least one wireless network the wireless service quality information from at least one of: a switch implemented by the at least one wireless network, a Home Location Register (HLR) implemented by the at least one wireless network, a home subscriber server (HSS) implemented by the at least one wireless network, a Unified Data Management (UDM) implemented by the at least one wireless network, a wireless service quality information processor implemented by the at least one wireless network, a wireless service quality information server implemented by the at least one wireless network, and the at least one wireless device that is receiving wireless service from the at least one wireless network.

16. The process for implementing the dynamic roaming PLMN of claim 14, wherein:

the wireless service quality information comprises at least one of: whether the at least one wireless device is registered to a Radio Access Network, a current cell tower identification (ID) that the at least one wireless device connects, a Location Area Code (LAC) for the at least one wireless device, a signal strength (dB) for the at least one wireless device, and/or the at least one wireless network, a Signal-to-Noise Ratio (SNR) for the at least one wireless device and/or the at least one wireless network, an LTE RSSI (Received Signal Strength Indicator) for the at least one wireless device and/or the at least one wireless network, an LTE RSRQ (Reference Signal Received Quality) for the at least one wireless device and/or the at least one wireless network, an LTE SINR (Signal to Interference & Noise Ratio) for the at least one wireless device and/or the at least one wireless network, an LTE CQI (Channel Quality Indicator) for the at least one wireless device and/or the at least one wireless network, a RSRP (Reference Signal Received Power) for the at least one wireless device and/or the at least one wireless network, a data latency for the at least one wireless device and/or the at least one wireless network, jitter for the at least one wireless device and/or the at least one wireless network, and a data throughput for the at least one wireless device and/or the at least one wireless network.

17. The process for implementing the dynamic roaming PLMN of claim 11, further comprising:

receiving with the processor geographic location information from the at least one wireless network for the at least one wireless device;

storing in a database the geographic location information related to the at least one wireless device;

analyzing with the processor the geographic location information related to the at least one wireless device; and determining with the processor that at least one wireless device would benefit from modification of a public land mobile network (PLMN).

18. The process for implementing the dynamic roaming PLMN of claim 17, wherein:

the geographic location information comprises at least one of: a current cell tower identification (ID) that the at least one wireless device connects, a Location Area Code (LAC) for the at least one wireless device, and a location determined by a global navigation satellite system (GNSS) with a location determination device implemented by the at least one wireless device.

19. The process for implementing the dynamic roaming PLMN of claim 11, further comprising:

receiving with the processor wireless carrier service information indicating reduced or limited wireless service provided by a particular carrier for particular geographic region;

storing in a database the wireless carrier service information related to the at least one wireless device;

analyzing with the processor the wireless carrier service information related to the at least one wireless device; and determining with the processor that at least one wireless device would benefit from modification of a public land mobile network (PLMN).

20. The process for implementing the dynamic roaming PLMN of claim 11, further comprising:

receiving with the processor wireless service quality information from at least one wireless network for the at least one wireless device;

receiving with the processor geographic location information from the at least one wireless network for the at least one wireless device;

receiving with the processor wireless carrier service information indicating reduced or limited wireless service provided by a particular carrier for particular geographic region;

storing in a database the wireless service quality information, the geographic location information, the wireless carrier service information and equipment type information related to the at least one wireless device;

analyzing with the processor the wireless service quality information, the geographic location information, the wireless carrier service information, and the equipment type information related to the at least one wireless device; and determining with the processor that at least one wireless device would benefit from modification of a public land mobile network (PLMN).

* * * * *